United States Patent [19]
Dickie et al.

[11] Patent Number: 5,587,707
[45] Date of Patent: Dec. 24, 1996

[54] DATA TRANSFER

[75] Inventors: Neil M. Dickie; Steven M. Hudson, both of Dorset, United Kingdom

[73] Assignee: Flight Refuelling Limited, Dorset, United Kingdom

[21] Appl. No.: 351,457

[22] PCT Filed: Jun. 15, 1993

[86] PCT No.: PCT/GB93/01272

§ 371 Date: Dec. 13, 1994

§ 102(e) Date: Dec. 13, 1994

[87] PCT Pub. No.: WO93/26115

PCT Pub. Date: Dec. 23, 1993

[30] Foreign Application Priority Data

Jun. 15, 1992 [GB] United Kingdom ............... 9212685

[51] Int. Cl.$^6$ .......................... G08B 19/00; G08B 21/00
[52] U.S. Cl. ................ 340/870.09; 340/854.4; 166/65.1
[58] Field of Search ...................... 166/250, 336, 166/366, 65.1, 66, 901, 902; 340/854.4, 854.6, 855.4, 870.09

[56] References Cited

U.S. PATENT DOCUMENTS

| | | | |
|---|---|---|---|
| 3,129,394 | 4/1964 | Long | 333/27 |
| 3,551,890 | 12/1970 | Silverman | 340/171 |
| 3,732,534 | 5/1973 | Koomey et al. | 340/151 |
| 3,750,096 | 7/1973 | Koomey et al. | 340/151 |
| 4,800,385 | 1/1989 | Yamazaki | 340/854.6 |
| 4,901,069 | 2/1990 | Veneruso | 340/853 |
| 5,256,844 | 10/1993 | Grosvik et al. | 219/10.51 |
| 5,335,730 | 8/1994 | Cotham, III | 166/374 |

FOREIGN PATENT DOCUMENTS

| | | |
|---|---|---|
| 0468359 | 1/1992 | European Pat. Off. . |
| 57-026942 | 2/1982 | Japan . |

OTHER PUBLICATIONS

Combination of Corrosion–Survey Methods Improves Protection–M. D. Allen & N. R. Barnes–Oil & Gas Journal Feb. 29, 1988 pp. 59–64.

*Primary Examiner*—Jeffery Hofsass
*Assistant Examiner*—Timothy Edwards, Jr.
*Attorney, Agent, or Firm*—David L. Davis

[57] ABSTRACT

A sub-sea oil pipeline installation comprising a production platform (10) and sub-sea facilities (15) at a plurality of well-heads (16), has a data transmission system by which data is transmitted in either direction between the master platform (10) and the sub-sea facilities (15) via communication channels formed by the electrically conducting material of the pipelines (12, 14). The data is transmitted in the form of a VLF or ELF electro-magnetic signal which comprises changes of voltage level oscillating about the DC voltage level of the pipe (12, 14) so that the mean level of the signal is the DC voltage level of the pipe (12, 14).

16 Claims, 17 Drawing Sheets

FIG.9 Main Loop.

Serial Interrupt Loop.

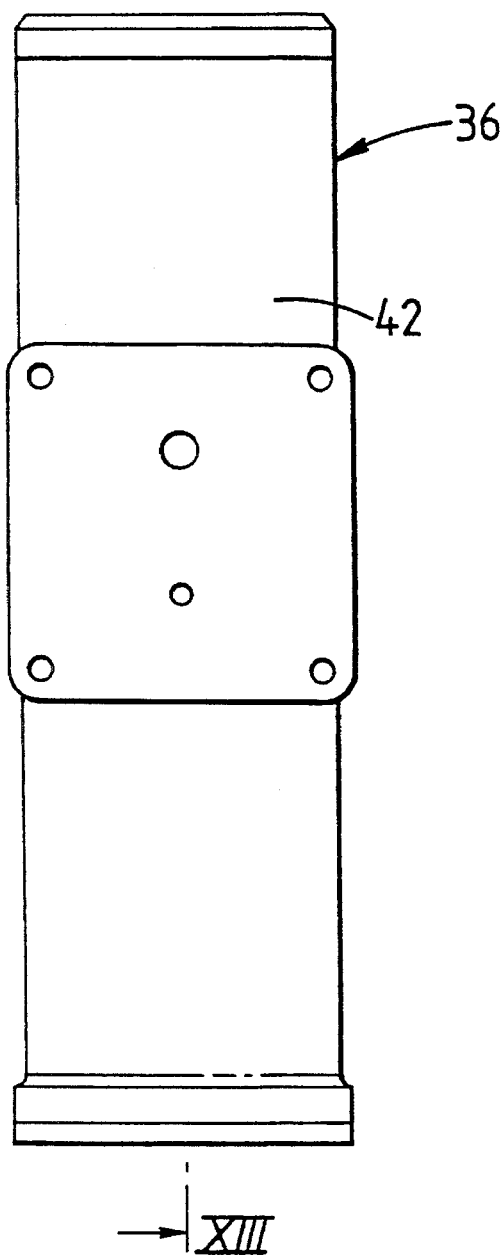
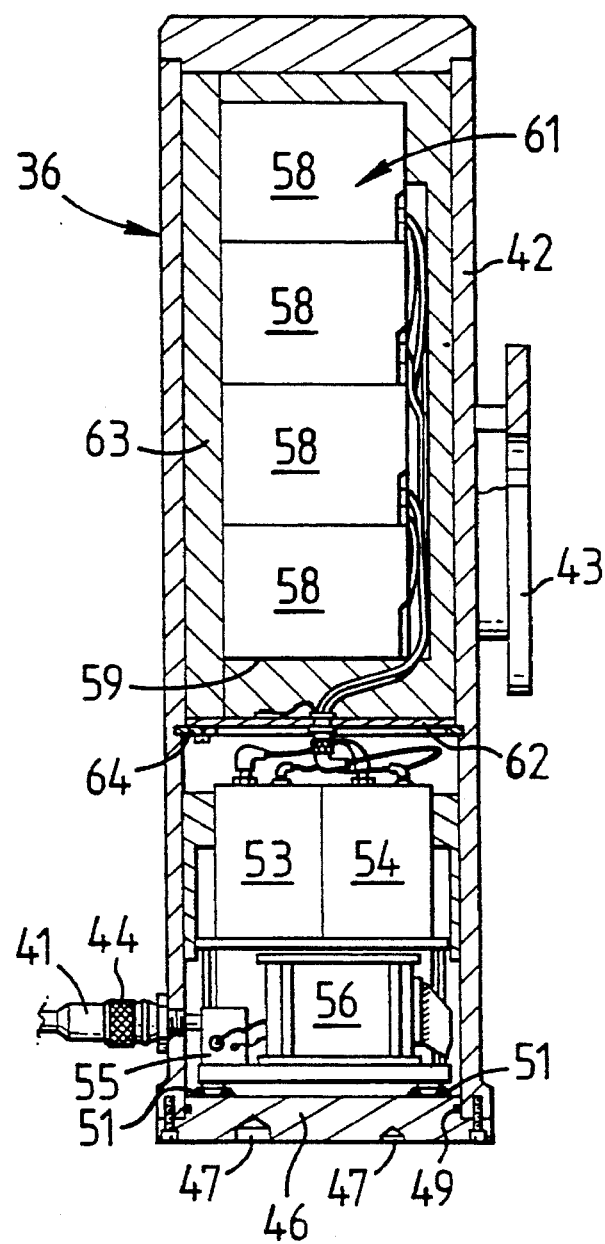

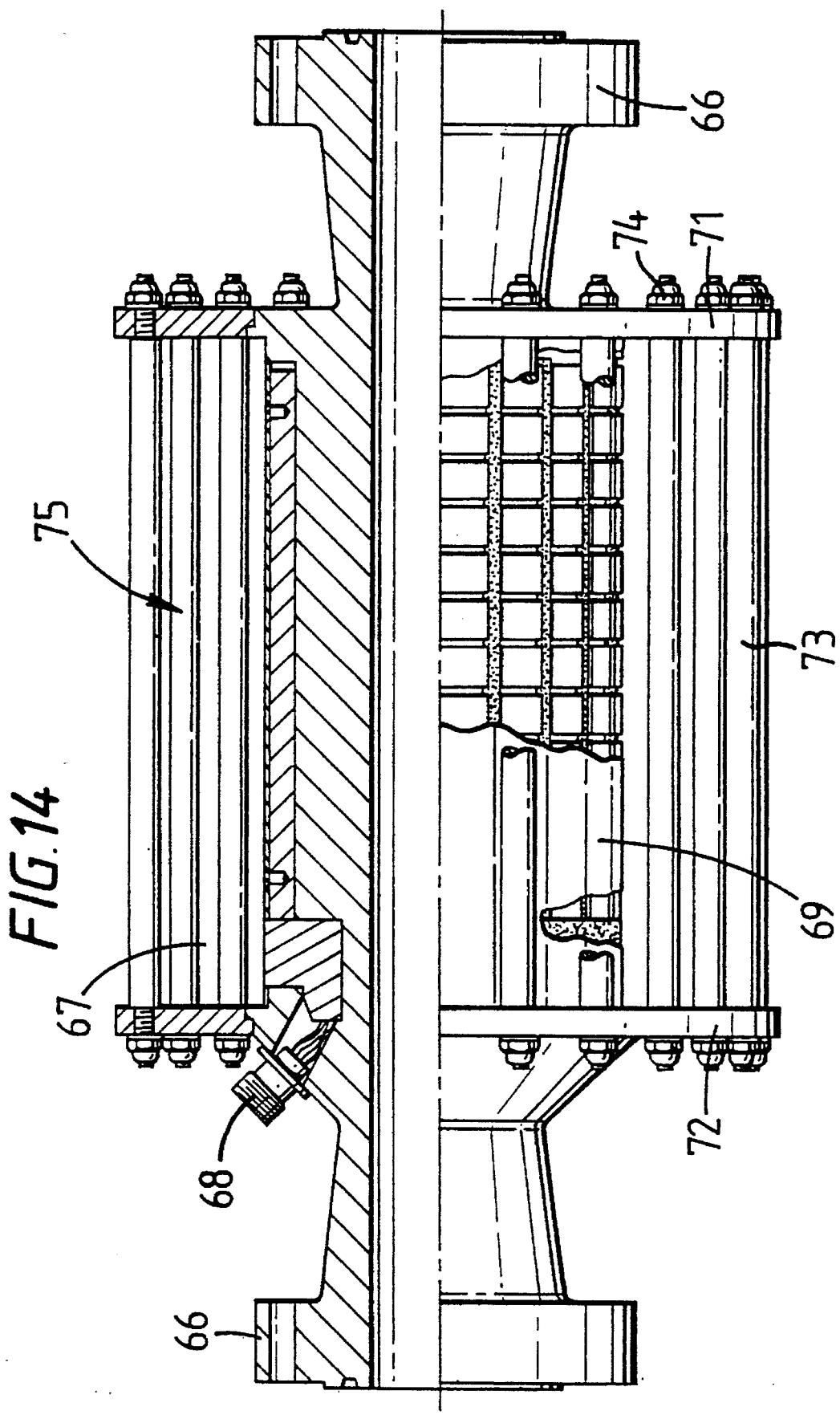

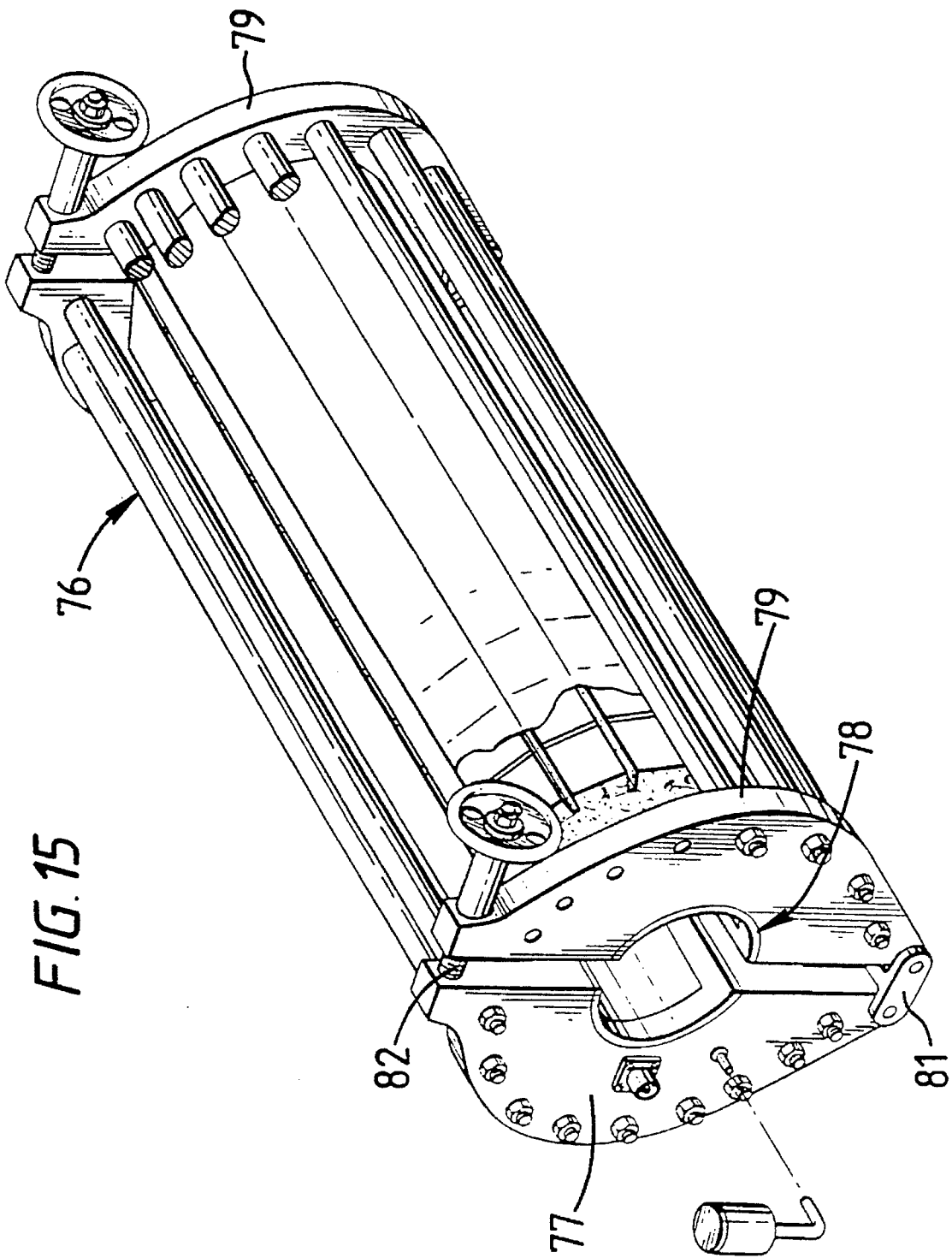

DATA TRANSFER

DESCRIPTION

This invention relates to a pipeline system comprising a metal pipeline having a coating of insulating material which, in conjuction with sacrificial anodes electrically connected to the pipe, provides cathodic protection, there being signal generating means adapted to he coupled to the pipeline and operable when so coupled to apply data to be transmitted in signal from to the pipeline for conveying along an electrically conducting channel formed by the metal pipeline.

U.S. Pat. No. 3,129,394 discloses the use of a pipeline to transmit alternating current signals. The pipeline is not used as a wire or conductor as such. It is used as the inner conductor of a coaxial cable. The insulating wrapping (provided for corrosion protection) provides the dielectric and the ground surrounding the pipe acts as the other conductor. By employing the pipe and ground as a co-axial cable, attenuation is substantially reduced and useful signals can be transmitted over substantial distances by amplification of the signal at one or more intermediate stations. Due to dissipation by leaks in the pipe wrapping, and other reasons, for most of the frequency ranges taught it was considered necessary to use higher output power than most communication systems. There is a fear that that will be undesirable because it will interfere with the normal direct current cathodic protection of the pipeline. However the possibility of using signals in the audio range is hinted at. It is said that the use of the pipe and surrounding earth as an alternating current transmission means will not interfere with the normal direct current cathodic protection of the pipeline but there is no disclosure of how this was achieved.

U.S. Pat. No. 3,551,890 discloses a system wherein a metal pipeline forms an electrically conducting channel for transmission of data, there being signal generating means adapted to be coupled to the pipeline and operable when so coupled to apply data to be transmitted in a signal form to the pipeline for conveying along the channel. In carrying out the teachings of that reference data is transmitted by modulating either the amplitude or the frequency of an AC carrier signal. We have found that no useful signal could be detected at the end of a pipeline which was 4 km long using such a technique. In practice it is desirable to transmit data over considerably greater distances than that in such pipeline installations.

An object of this invention is to provide a pipeline system with means for transmitting data over considerably greater distances without interference with the cathodic protection of the pipeline.

According to this invention there is provided a pipeline system comprising a metal pipeline having a coating of insulating material which, in conjunction with sacrificial anodes electrically connected to the pipe, provides cathodic protection, there being signal generating means adapted to be coupled to the pipeline and operable when so coupled to apply data to be transmitted in signal form to the pipeline for conveying along an electrically conducting channel, formed by the metal pipeline, wherein the signal generating means are operable to generate as the signal a pulsed electromagnetic signal which comprises changes of voltage level in a very low frequency range (VLF and below), and wherein means are provided which are operable to use data transmitted via the channel provided by the pipeline to monitor the condition of the insulation of the pipeline. Preferably the signal generating means are operable to generate the electromagnetic signal in the very low frequency range (VLF and below) so that it comprises changes of voltage level oscillating about the DC voltage level of the pipeline so that the mean level of the signal is substantially the DC voltage level of the pipeline. The longer the pipeline that forms the channel the lower the frequency that would be used. For the longer pipelines frequencies in the extremely low frequency (ELF) range (3 to 300 HZ) would be used whereas for short pipelines frequencies in the VLF range (3 to 30 kHZ) could be suitable. The available data bandwidth depends on constraints imposed by the physical situation for any particular application. For this reason, provided adequate bandwidth is available, any form serial data signal can be transmitted including analogue (e.g. video) and time encoded digital signals.

In an endeavour to avoid the use of the traditional umbilical cable which has been used for many years in the sub-sea oil pipeline industry for two-way transmission of telecommunications between a master station on a production platform and each of a number of sub sea facilities at wellheads, amongst other services such as the supply of hydraulic power to the sub-sea facilities and the supply of chemicals for injection into the fluid to be conveyed from the well-head through the pipeline, apart from the proposals of Long and Silverman in U.S. Pat. No. 3,129,394 and U.S. Pat. No. 3,551,890 referred to above, it has been proposed that underwater acoustics be used to transmit data between the master station and the sub-sea facilities through the sea. Such a proposal has a number of drawbacks. Thermal barriers at varying depths in the sea would cause refraction of the signal resulting in multi path fading and complete loss of signal. To achieve the range requirements, transmitter powers in excess of 1 KW would be required. Such a system would be expensive and could only support low data rates.

A preferred application of this invention is to sub-sea oil pipeline installations for the transfer of data between sub sea facilities and their production platform, the data transfer comprising instrumentation or status information from any point on the pipeline installation, use being made of an actual pipe carrying the fuel/water between a well-head and the production platform as the pipeline which forms the electrically conducting channel.

The application of this invention to sub sea oil pipeline installations which do not require a supply of chemicals for injection into the fluid to be conveyed from the wellhead through the pipeline enables elimination of the traditional umbilical cable which has long been desired. Such an application of this invention is more satisfactory than earlier proposals to achieve that end. Other arrangements can readily be made to meet any requirement for power at the sub-sea facility so that the need for a hydraulic supply can be avoided.

The levels of safety and reliability of the preferred embodiment of this invention are high because buried steel pipeline is a robust structural medium for signal connection of relatively low impedance. Because of physical constraints, over long distances the available data rate is likely to be low. However, in the preferred application of this invention, timeliness of data is not critical and would allow the use of forward error detection and correction signal encoding to provide high data integrity without noticeable time delay to the user.

The invention takes advantage of the current techniques used for insulation of the metal pipelines by coating them with an insulating material to prevent corrosion of the pipe. Application of the invention must take account of and therefore co-exist with active or sacrificial cathodic protection. These measures enable a prediction of the energy loss through regions of the pipeline where the insulation is absent or degraded such as weld joints. It is in that way that the invention is adapted as a means for monitoring the condition of the pipeline.

The invention is also applicable to the so-called 'flexible' pipeline construction.

No direct current leak paths are introduced by the application of the invention to a pipeline.

The range of effective operation of the invention is thought to be limited to a distance (say 35 KM) within which the VLF or ELF signal and the cathodic protection of the pipeline may coexist on the pipeline without the level of such protection being reduced. VLF or ELF signals are used because the characteristic of the pipeline acts as a low pass filter with acceptable attenuation for the range of effective operation.

In order to minimise the impact of signal modulation on the cathodic protection voltage, it is desirable to arrange for the signal potential to sum to zero and for transmission to take place only in short bursts such that only small variations in potential are seen on the pipeline.

In the preferred embodiment, signalling is managed by a master station located on the platform, and takes place in one of three modes, viz. normal data transfer, special data transfer and alarm interrupt. Normal and special data transfers are initiated by the master station. Alarm interrupts are initiated by any sub-sea unit which detects an alarm condition. All signal sequences conveniently incorporate an interrupt time domain to facilitate near real time transfers of the alarm information.

Data flow is half-duplex in operation of this preferred embodiment of the invention. The master station manages communication between the platform and the sub-sea data transfer units (DTUs). In so doing it transmits synchronisation, communication management and configuration instructions to the sub-sea DTUs. The sub-sea DTUs transmit time-tagged telemetry data, health monitoring data and alarm data items to the master station.

In the preferred embodiment, a transmitting DTU, either at the platform or at a sub-sea facility is operable to launch a signal onto the pipeline, the frequency band of which is selected to avoid known EM noise and the amplitude of which is sufficient to overcome ambient noise to allow detection at the receiving DTU. The signal is received by all the DTUs on the pipeline. Onto this signal, the transmitting DTU imposes a digital data stream.

Conveniently a DTU will only respond to two signal types, viz. those uniquely addressed to it and those globally addressed to all DTUs on the network. The signal content is extracted from the pipeline EM noise and decoded to provide the data items. The transmitting DTU then falls silent in readiness to receive requested data.

Normal data transfer is an automatic procedure which interrogates each DTU on the network and logs their telemetry data for use on the platform. It is proposed that a complete DTU data log will be transferred to the platform in 60 seconds, with the objective of achieving an undetected bit error rate of $10^{-9}$.

Special data transfer is a manual intervention with the system, and enables direct operator communication with its selected DTU whereby an operator can configure and control any sub-sea DTU.

A sub-sea DTU which detects an alarm or a trend which will lead to an alarm condition in its transducer array, will transmit an alarm identity during the interrupt time domain of any ongoing transmission.

Preferably all transmissions are curtailed by the alarm interrupt code.

In the event that more than one DTU senses an alarm condition, the master station lists the DTUs which have raised an alarm and schedules the transfer of their alarm data for logging and display. An audio tone may be provided to alert the operator that an alarm condition is detected.

To expedite the transfer of this alarm data, it is envisaged that the number of data items transferred during an alarm condition would be minimised.

Signal extraction from the pipeline EM noise may be achieved by use of parity bits and proprietary error detection and correction (EDAC) techniques, which enable the receiving DTU to assess the integrity of the data.

If integrity is poor, then the receiving DTU may be arranged to automatically request repeat of the data.

A thermoelectric generator may be provided for sub-sea locations which do not have mains power available. Such a thermoelectric generator is particularly suitable for use at oil production wells. The power requirements of the sub-sea elements of a system in which the invention is embodied are low and that allows construction of a practical thermoelectric generator with high levels of redundancy. A suitable thermoelectric generator has no moving parts and employs solid state arrays of thermoelectric devices which are sealed using epoxy for sub-sea installation. The external surface of the generator may be sealed by an uninterrupted plastic skin to avoid corrosion or leakage problems. Two configurations of such a power generation unit are proposed, viz. in-line or clamp-on. These are functionally similar. Rather than such a thermoelectric generator, a flow turbine generator may preferably be provided for use at a water injection well.

Conveniently, a DTU provides the processing capacity to:

1. Manage the system start up after any extended dormancy period;

2. Sample the transducer array and identify alarm conditions;

3. Receive data communications from the master station;

4. Decode telemetry requests from the master station;

5. Transmit encoded telemetry data on request or alarm conditions on occurrence to the master station; and 6. Provide power conditioning and distribution.

A memory array within the processor may provide a circular buffer in which 400 data items from each of 32 transducers may be stored between data transfers. The sampling rate and transducer ranges may be configurable from the master station.

In the preferred embodiment, a pipeline interface is required at the platform and at any location to be instrumented. This function requires pre-amplifier, modulator/power amplifier and signal processing to allow for half duplex communication over the pipeline. Using transformer or other suitable coupling, the interface launches the carrier signal and data stream onto the pipeline.

To complete the signalling circuit, the DTU may exploit the earth connections to the well, and a sea return at the production platform to provide a low impedance return path. Alternatively a dedicated sea water electrode may be required to avoid potential corrosion problems at the platform.

The data could be data concerning conditions at a down hole location of a sub-sea well and could be transferred from that location along structure of the production string of that well.

One embodiment of this invention, and a possible modification of a feature of that embodiment, will be described now by way of example with reference to the accompanying drawings, of which:

Figures 1, 2:
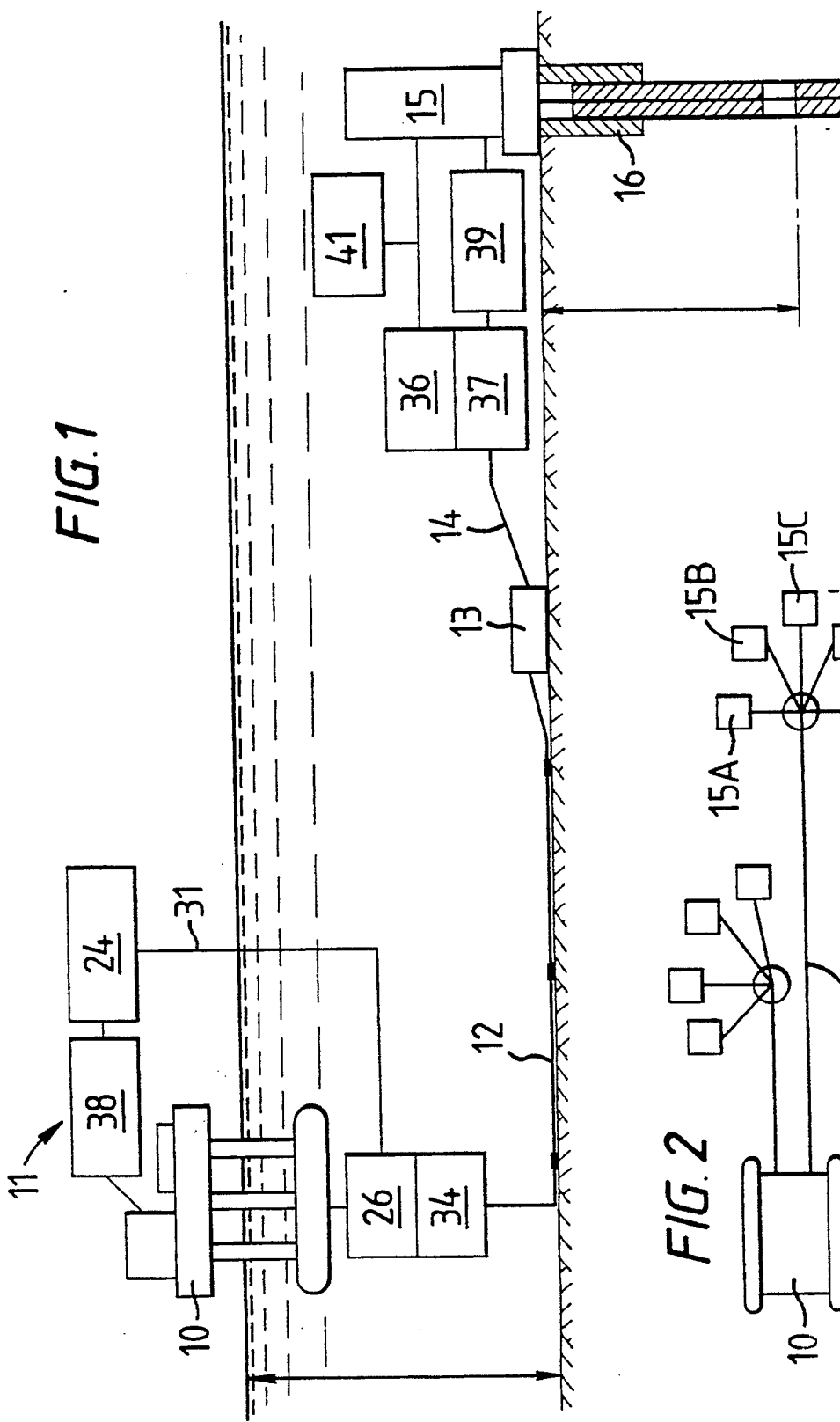
FIG. 1 is a block diagram of a sub-sea oil pipeline installation incorporating a data transfer system in which this invention is embodied for the transmission of data between a master station on a production platform and a sub-sea installation at a wellhead.
FIG. 2 is a block diagram illustrating the system illustrated in FIG. 1 applied to a sub-sea oil pipeline installation wherein the master station on the production platform is connected to sub-sea installations at a number of wellheads.
Figure 9:
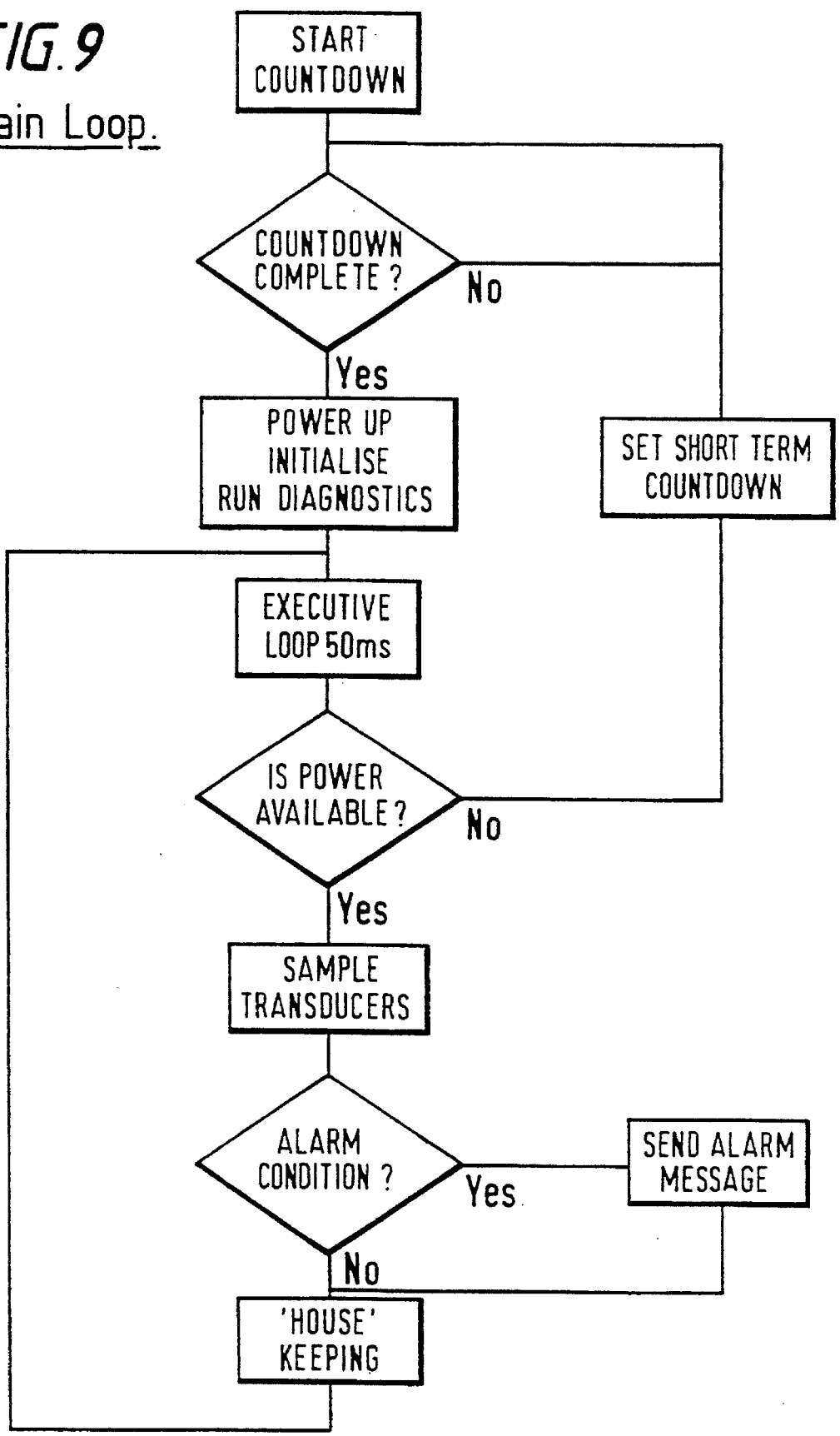
Figure 10:
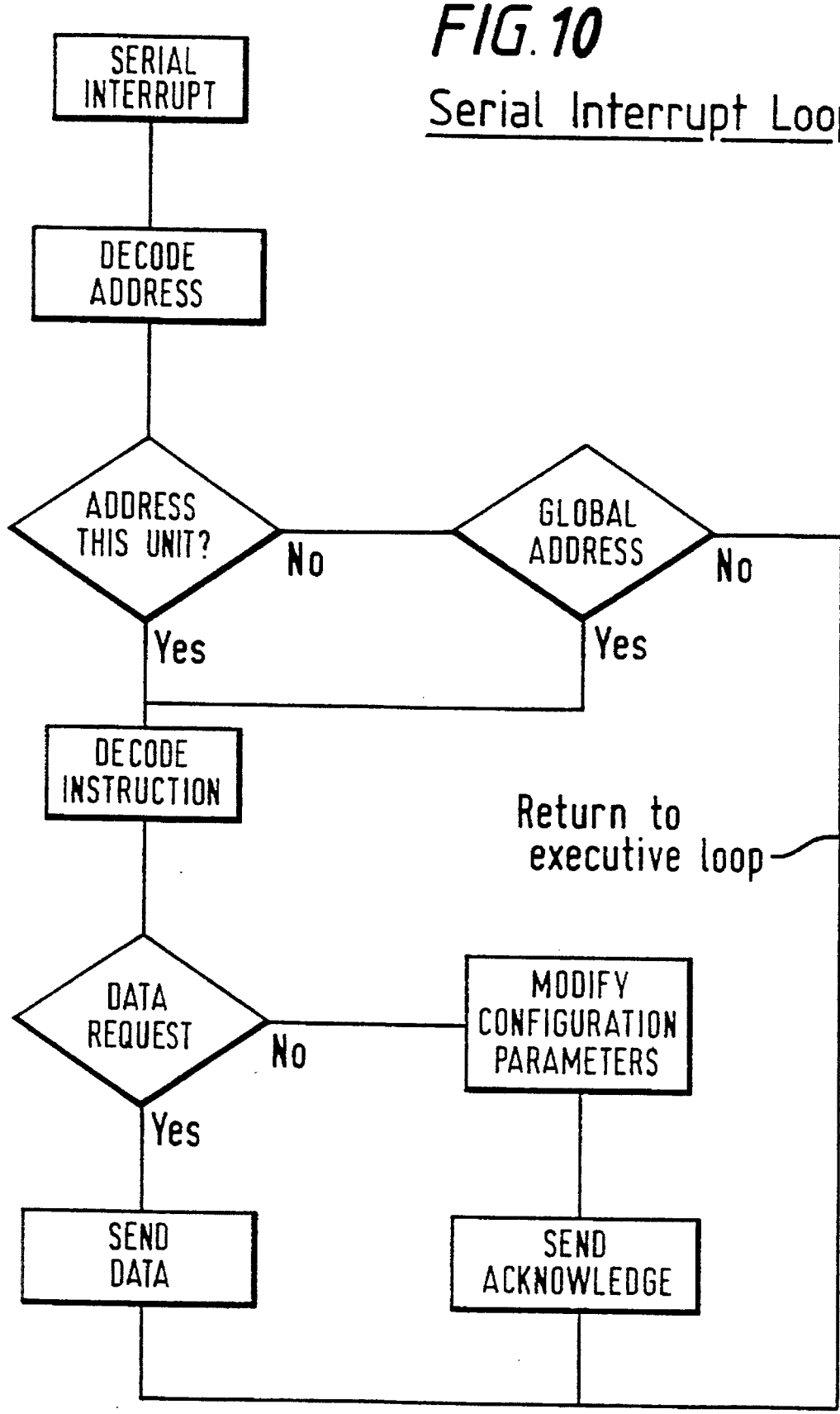
Figure 11:
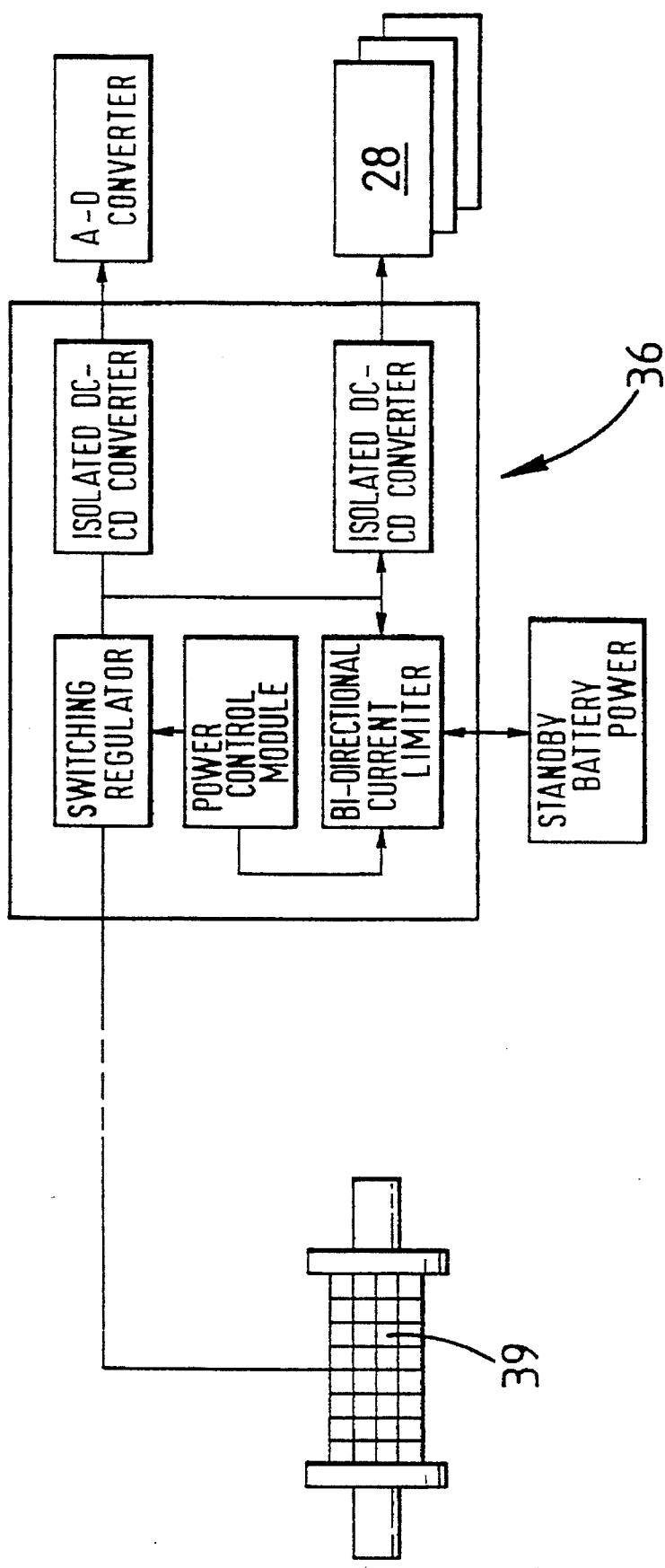
Figure 16:
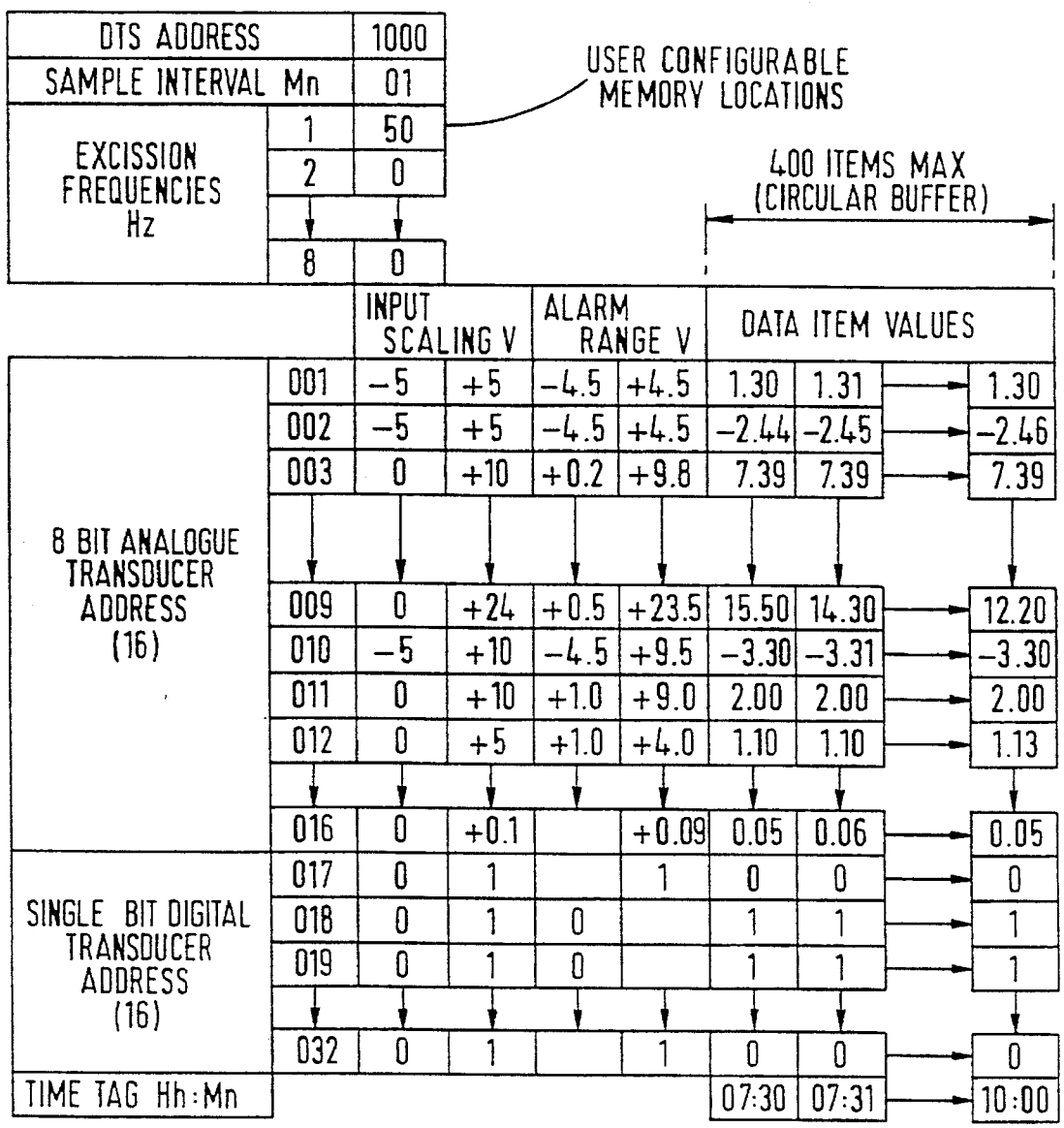
Figure 17:
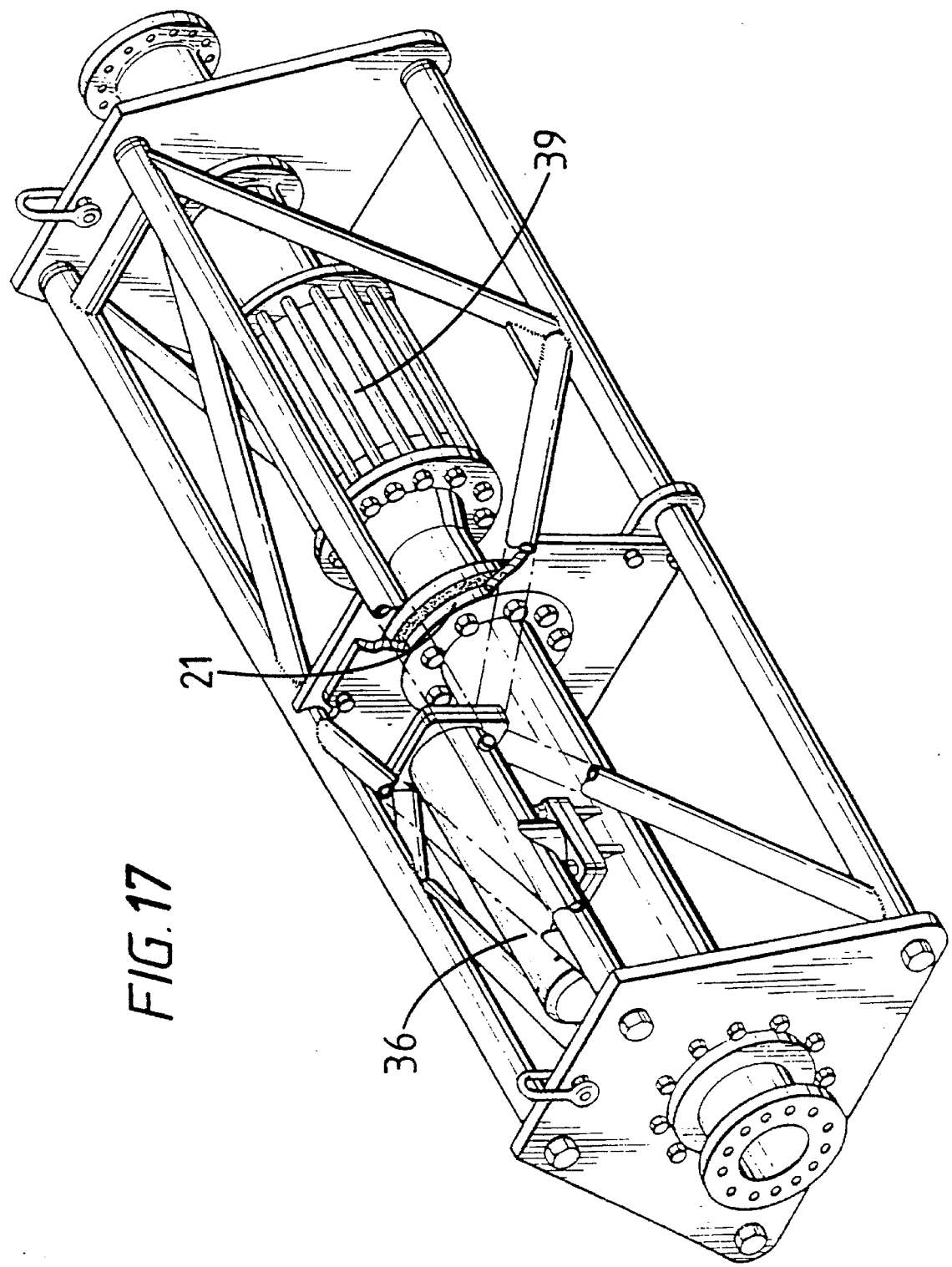
Figure 18:
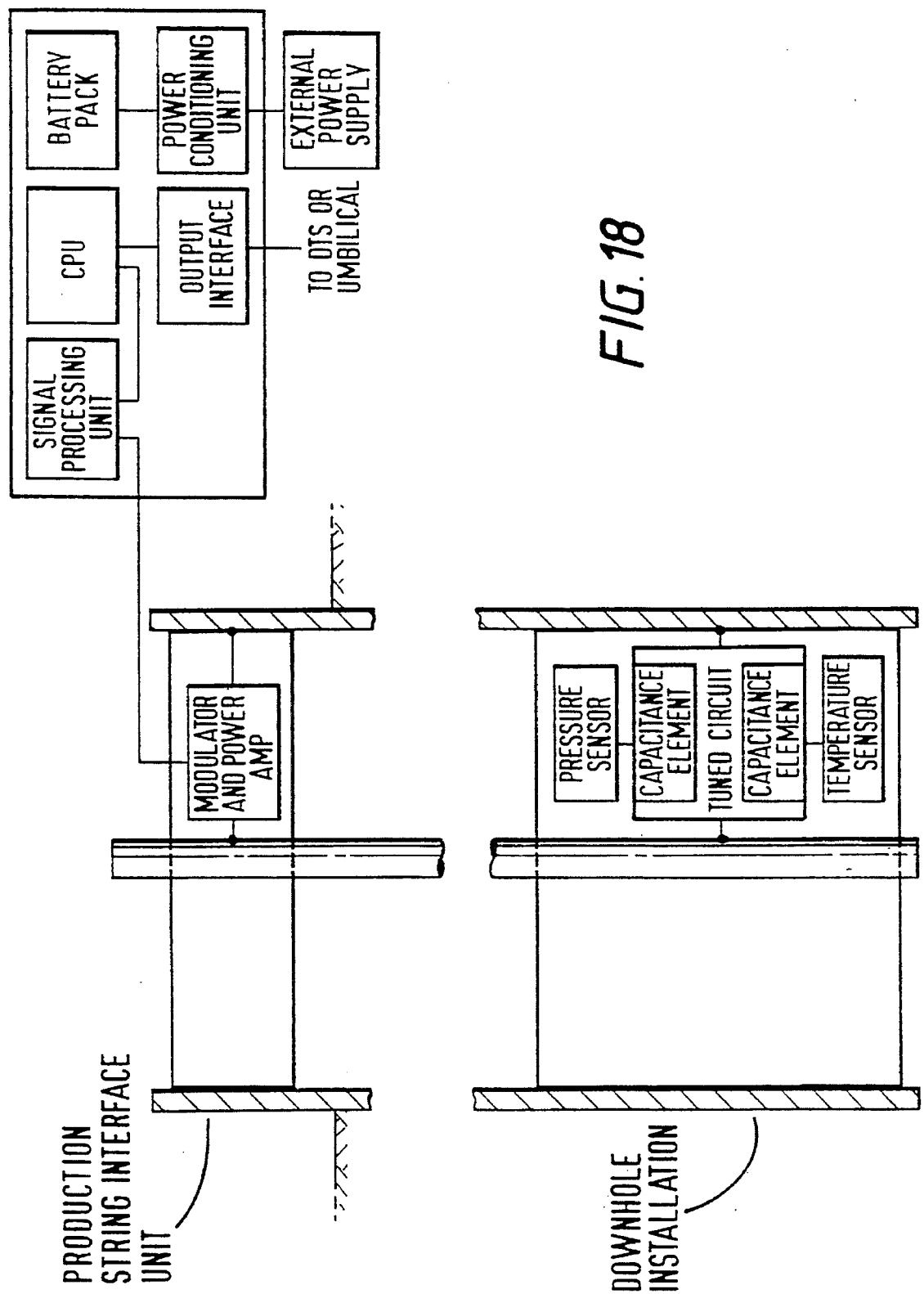
Figure 19:
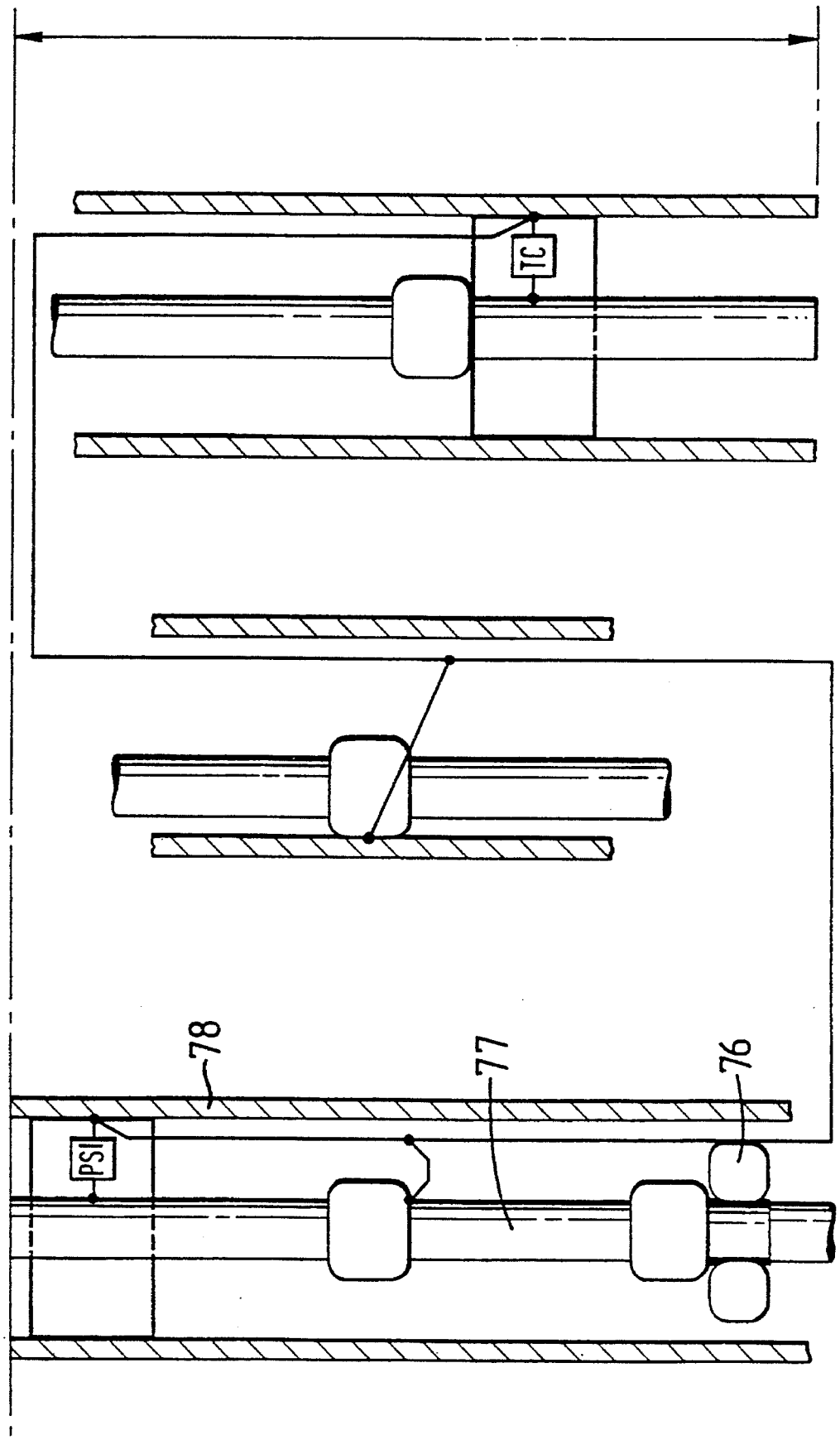

FIGS. 9 and 10 together comprise an operational flow diagram of the system shown in FIG. 1;

FIG. 11 is a block diagram illustrating the power conditioning and power distribution arrangement for a sub-sea data transfer unit located at a wellhead of the system shown in FIG. 1;

FIG. 12 is an elevation of a data transfer unit of the system shown in FIG. 1;

FIG. 13 is a section on the line XIII—XIII in FIG. 12;

FIG. 14 is a partly sectioned side elevation of one form of power generation unit for use at a sub-sea installation of the system shown in FIG. 1, the part shown above the centre line being in section and the part shown below the centre line being in elevation but partly cut away to reveal hidden detail;

FIG. 15 is a view in perspective of another form of power generation unit for use at a sub-sea installation of the system shown in FIG. 1;

FIG. 16 is a diagram illustrating a data transfer system memory of the system shown in FIG. 1;

FIG. 17 is a view in elevation of an assembly of a data transfer unit and a power generation unit for installation at a sub-sea facility of the system shown in FIG. 1;

FIG. 18 is a block diagram illustrating installation of apparatus in which this is embodied on a sub-sea well production string at a down hole location; and FIG. 19 illustrates electrical current leakage and return paths in the apparatus shown in FIG. 16.

Figure 3:
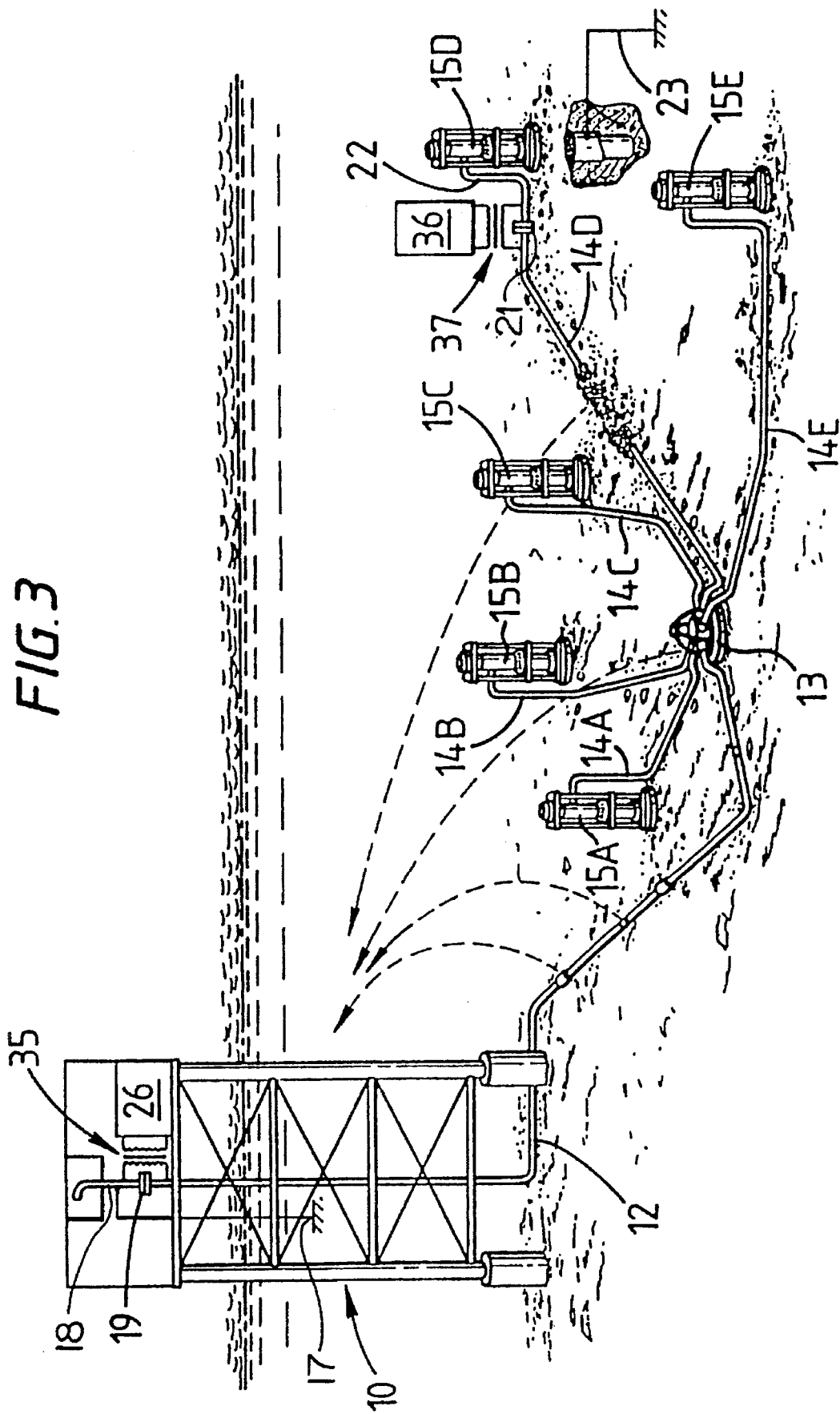
FIG. 3 is an illustration of the system shown in FIG. 2 with current leakage and return paths depicted thereon.

FIGS. 1, 2 and 3 show a production platform 10 which supports a master station 11 of the data transfer system, a pipeline 12 connecting the production platform 10 to a manifold 13, and five branch pipelines 14A–E which each connect the manifold 13 to a respective tree 15A–E of a respective one of five wellheads 16A–E. An electrically isolating pipe coupling 19 electrically isolates the pipeline 12 from the production platform 10. A short length of pipe 18 which leads from the pipe coupling 19 into the production platform 10, is electrically coupled to the sea at 17. Each branch pipeline 14A–E is electrically isolated from the respective tree 15A–E by a respective electrically isolating pipe coupling 21. The short length 22 of pipe leading into the respective tree 15A–E is grounded to the earth through the well casing of the respective wellhead 16A–E at 23.

Figure 6:
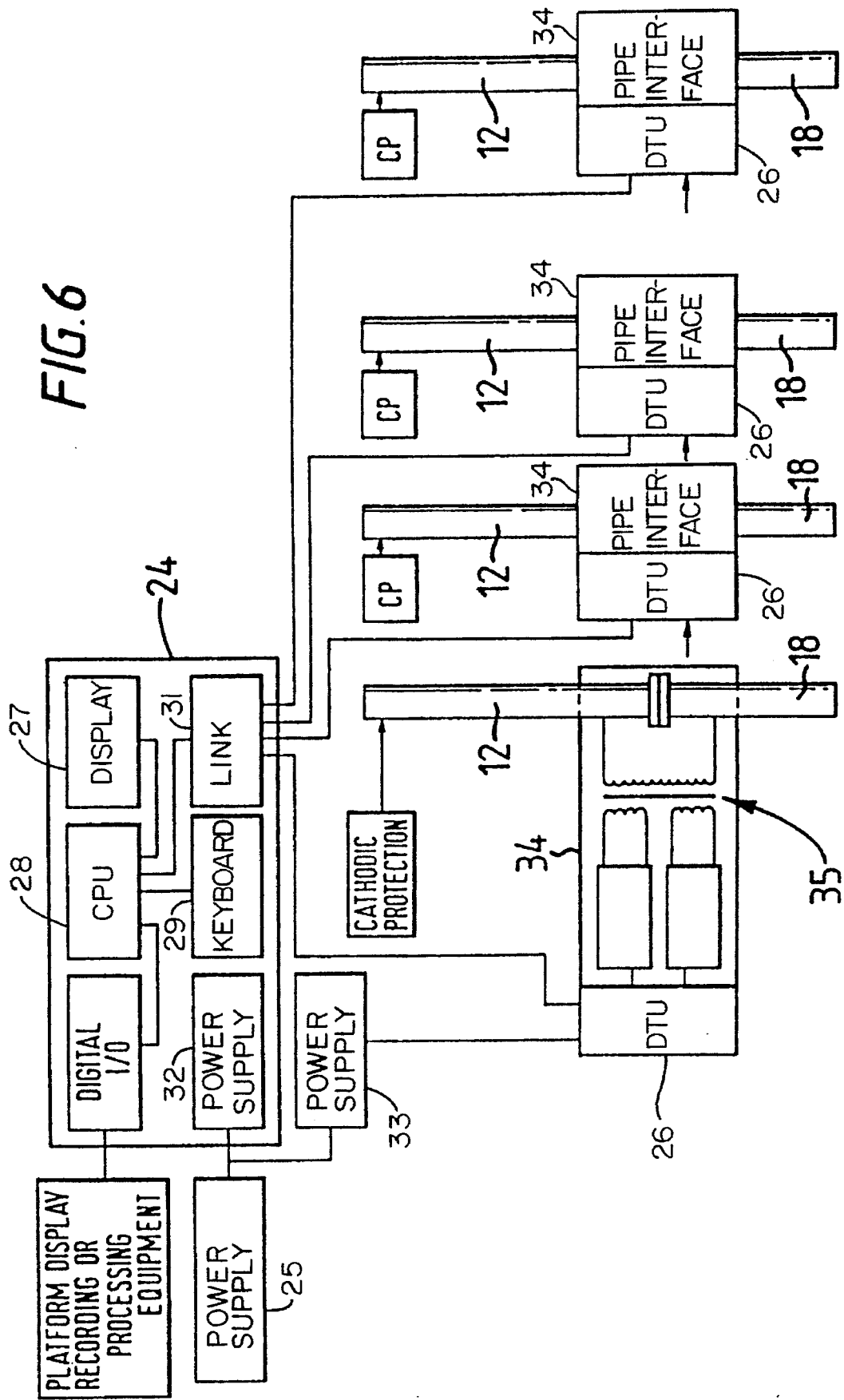
FIG. 6 is a block diagram of the arrangement of the master station of the system shown in FIG. 1.
Figure 7:
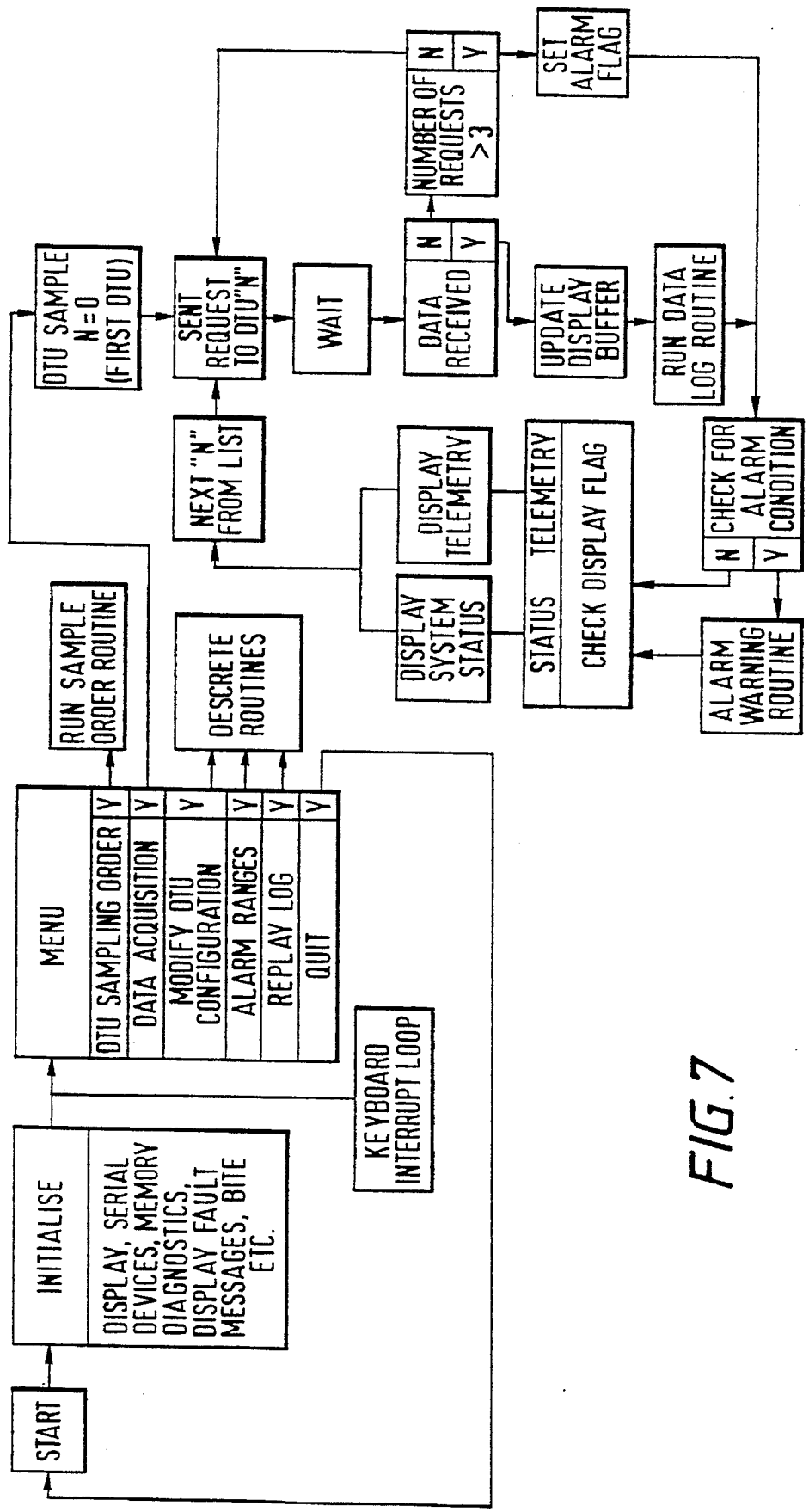
FIG. 7 is an operational flow diagram for the master station shown in FIG. 1.

The Master Control Station 11 which is shown in block schematic in FIG. 6 comprises 3 main parts: viz. a control unit 24, a Power Supply 25 and a DTU 26.

The control unit 24 is based on a high performance IBM PC compatible industrial computer. FIG. 6 shows the control unit 24 includes a display 27, CPU 28 and keyboard 29. Those elements of the control unit 24 together with disc drives and expansion slots are mounted in an anti-vibration rack within an environmental protective enclosure. This ensures adequate environmental protection during storage, transport and use.

The operating software is resident on the hard disc with user configurable files held on floppy discs.

Each downpipe 12 from the platform 10 will require a separate DTU 26. Communication with these DTUs 26 is by RS 422 link 31 or, if necessary, in harsh electrical noise environments, by optical fibre. Provision is made for a minimum of 8 serial duplex lines using an interface card fitted in an expansion slot of the PC 24.

The following system control functions are available using the control unit 24:

Special data transfer to provide telemetry data immediate request;
Normal data transfer to provide continuous sequential telemetry request;
Sample rate selection;
Time-tagged data logging (onto floppy disc);
Replay of data logged telemetry from floppy disc;
Selection of "System Status" or "Telemetry" data;
Display an alarm message if any parameter is outside limits;
Range limit setting for alarm function;
Modify telemetry sample order and rate; and
Provide additional system outputs.

The control unit display 27 has three selectable screens as follows:
Command menu;
System status;
   DTU supply voltage;
   Link margins;
   TEG differential temperature; and
   DTU diagnostic data; and
Telemetered parameters.

The control unit software is written in a high level language such as "C" in an MS DOS operating system environment. The programme will auto-start to prevent tampering or use of the computer for another purpose by personnel. The use of "C" language allows rapid programme development whilst maintaining excellent peripheral drive capability.

The software is structured using an executive module to schedule other modules sequentially with interrupt driven modules taking priority when needed.

The Master Station 11 is designed to operate from mains supply. To accommodate conditions where this supply is intermittent, Uninterruptible Power Supplies (UPS) 32 and 33 are provided for both the computer equipment 24 and the DTU 26.

The UPS 32,33 is sized to provide greater than 60 mins operation in the event of power failure.

A high performance filter is incorporated to protect against mains borne interface corrupting operation of the computer.

A separate pipeline interface 34 is provided for each pipe network 12,14 connected to the platform 10. The pipeline interface 34 incorporates the respective insulation joint 19 and the signal launch and capture take place by a coupling 35 at the respective insulation joint 19. This coupling 35 may be achieved by either direct connection to the pipe, capacitive coupling with the pipe or by use of a transformer with the pipe itself acting as one winding thereof.

The pipeline 12,14 is usually provided with sacrificial cathodic protection anodes at spaced intervals and the remainder, apart from the area of weld joints, is coated with an insulating material to prevent corrosion of the pipe. The system will be arranged to overcome signal losses caused by up to 5% of the pipe external area being exposed electrically to the sea water. The anodes bias the pipeline 12,14 at a lower potential than the sea. The pipeline 12,14 can be regarded as a sequence of discrete stages, each containing a single anode and length of pipeline as is illustrated in FIG. 3. Each stage has an upstream and a downstream boundary. The initial boundary is at the platform end DTU 26 and the final boundary at a sub-sea DTU 36. Each stage contains a run of pipeline with self inductance and resistance elements distributed about a sacrificial anode.

The anode and the area of pipeline material exposed to the sea are represented by capacitive and resistance elements between the pipeline and the sea or earth paths. These distributed earths represent a constant potential above that of the pipeline itself, due to the cathodic protection. Within a single stage small circuits exist between the anode and the exposed material. The area of influence of the anode is substantially wholly within the boundary of the respective stage, so that the rate of erosion of the anode is effectively dependent only on the area of the exposed pipeline within the stage, a steady state potential difference with high current density being provided.

The purpose of the DTU 26 is to provide an intelligent interface between the Master Station 11 and the pipeline 12. Serial data is transmitted from the Master Station 11 to the DTU 26 over the RS 422 hard wire link 31. This is then formatted for transmission of telemetry request to a particular sub-sea DTU 36. This request is transmitted via the pipeline 12,14. The DTU 26 then waits for a reply which, when received, is re-formatted and transmitted back to the Master Station 11 over the RS 422 serial link 31.

It will be understood that, in order to deal with signal leakage losses and induced electrical noise, signal formatting and encoding elements are provided at the transmission end and signal recovery and decoding elements are provided at the receiving end of the pipeline 12,14.

Functionally, the Interface 34 is identical to a sub-sea version 37 described below. The DTU 26 is similar (if not identical) hardware to the sub-sea version 36. However, the software is substantially different.

If required, the control unit 24 can be fitted with interface electronics 38 to provide serial, digital or network communications to suit individual user needs.

The purpose of such connection is to provide dissemination of data. The interface circuitry to achieve this function is of proprietary type and is installed in the expansion slots provided in the control unit computer. The software driver is custom written to suit.

The sub-sea installation comprises the following equipments—the sub-sea DTU 36 mentioned above, a power generation unit (PGU) 39 and a transducer cable assembly 41.

The sub-sea DTU 36 provides the following functions:
Reception and decode of telemetry request signals;
Transmission of encoded telemetry;
Identification and transmission of alarm data;
Continuous sampling of transducer parameters;
System health monitoring; and
Maintenance of comprehensive data log.

Figure 8:
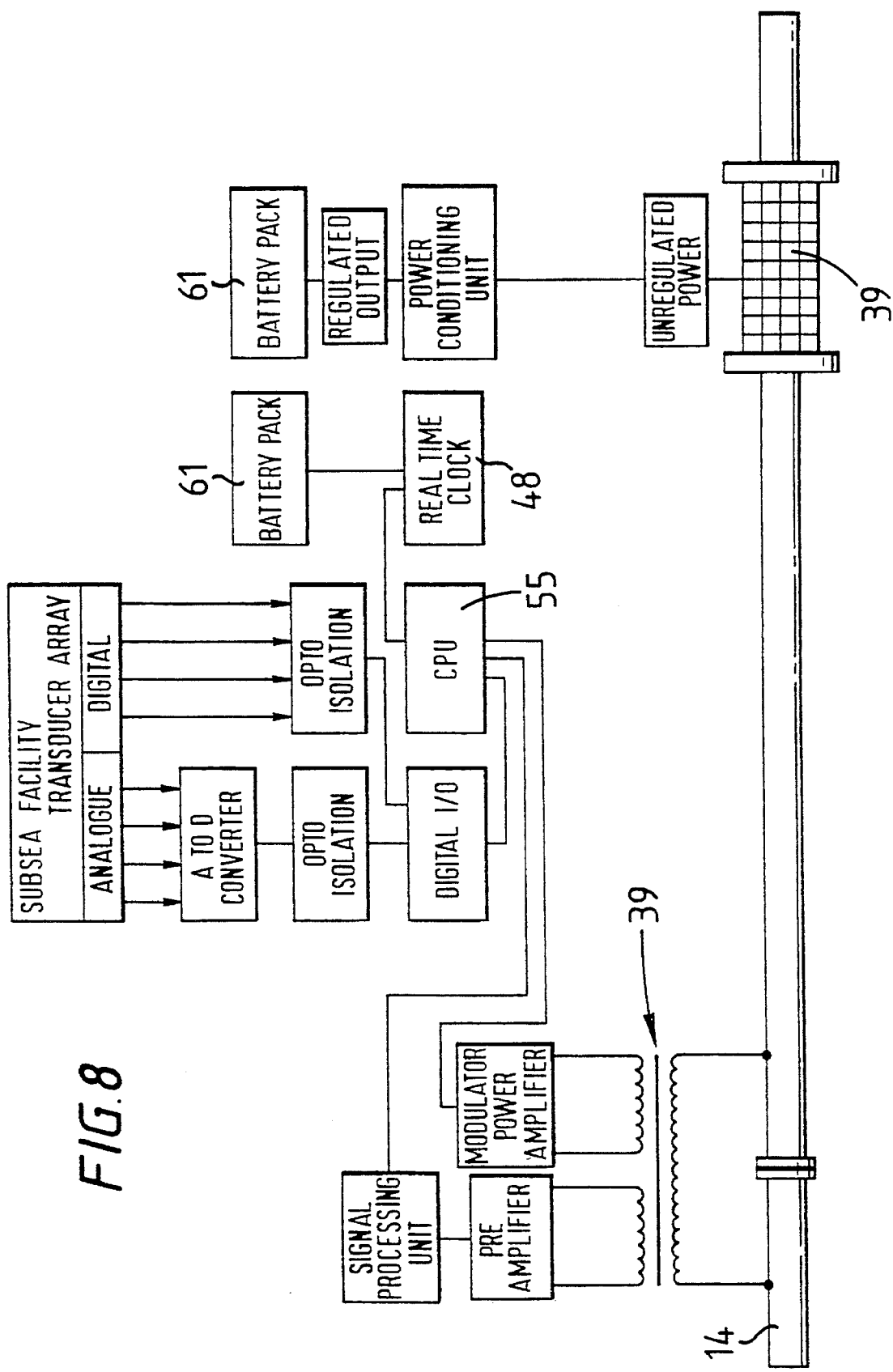
FIG. 8 is a block diagram of a data transfer unit of the system shown in FIG. 1.

A block diagram of the DTU 36 is presented in FIG. 8 and individual elements are described below.

The DTU 36 consists of a heavy walled steel main-tube 42 having a closing plate welded to its upper rim as shown in FIGS. 12 and 13. A side mounting plate structure 43 is welded to the tube 42 approximately halfway along its length.

A large, multi-pin, sub-sea mateable connector 44 is located near the lower end of the main tube 42. When installed, a special site dedicated, moulded cable assembly 41 (including branches to the power generation, flow line tap-in studs and transducer connectors) is mated with this connector 44.

The lower end of the main tube 42 is closed by a removeable endplate 46 which is bolted to the rim of the tube 42. Four lugs 47 at the periphery of the endplate 46 satisfy the end mounting requirement. The hole centres are identical to those of the side mounting plate 43, thus affording flexibility in mounting.

The end plate 46 is sealed to the internal surface of the tube 42 by an "O" ring 49 and includes four anti-vibration shockmounts 51 on its internal face. These provide mounting points for the electronics chassis 52 and electrically insulate the latter from the main tube structure 42. The chassis 52 includes mountings for a pre-amp 53, modulator/amplifier 54, a signal processor 55 and an electronics unit 56. The latter unit 56 consists of a rack containing half-size "Euro-cards" having the following functions:
1. Power conditioning (see FIG. 11) (3 cards);
2. CPU and battery powered clock (1 card);
3. A/D and OPTO insulation (1 card); and
4. Digital I/O with OPTO insulation (1 card).

The electronic chassis 52 is stabilised and supported at its upper end by means of a moulded polyethylene foam packing 57 fitted between the chassis 52 and the inside of the main tube 42.

Four sealed gas-recombination batteries 58 are mounted in a tray 59 and form the main battery pack 61. The pack 61 occupies the upper portion of the main tube structure 42 and is separated from the lower electronics bay by a "pressure" bulkhead 62.

The pack 61 is mounted in, and protected by, polyethylene foam packers 63.

The pressure bulkhead 62 seals off the battery bay so that the electronic components 53–56 of the DTU 36 are protected. Any pressure rise may be detected by a pressure transducer mounted on the upper face of the bulkhead 62. A pressure rise would be caused by the batteries 58 being charged at a rate high enough to cause "gassing", which is a most unlikely occurrence. The rate of charge will always be regulated below the gas step. The bulkhead 62 is sealed by an "O" ring and is retained by a split ring which locates in a groove 64 in the main tube wall. The split ring is locked in its groove 64 by means of a bolted block.

The sub-sea DTU software is written in modular form to enable thorough test prior to integration. This modular approach allows access to areas of code to provide modifications to suit particular requirements (user configurable).

The software uses an executive module to schedule other modules, except any interrupt driven modules. A main loop 65 is scheduled to run every 50 ms. The flow chart in FIGS. 9 and 10 illustrates logical operation of the DTU 36.

The executive module schedules the activities of all synchronous functions in the programme.

An input module is scheduled by the executive and acquires data from the digital I/O interface.

An analogue input module acquires a maskable number of analogue inputs, scales and offsets them, then stores into internal and external Random Access Memory (RAM) for use by other modules. The mask, scale and offset values are user configurable.

A real time de-bug monitor module is provided for use during development, test and evaluation. This monitor is standard software and allows real time monitor and modification of memory locations.

Depending on circumstances, the DTU 36 will operate in different modes, e.g. data link valid, link lost, sync search, data request etc. A logic module defines user configurable, logical operation of the DTU 36 for each of these modes.

The logic module is activated by a "signal detected flag" from the signal processor 55. Control of the signal processor 55 is then initiated to synchronise with the incoming data.

A Universal Serial Asynchronous Receiver Transmitter (USART) is initialised by an initialisation module to look for a pre-determined two byte header of a telemetry request frame. Once recognised, the USART interrupts the processor 55 and initiates the data validation procedure.

If the telemetry request is valid then the appropriate data is transmitted back to the master controller 24 under control of a telemetry send module. This process is illustrated by the flowchart in FIGS. 9 and 10.

A timer module 48 interrupts the processor 55 every 50 ms to set flags etc and update timer counters for use by other modules.

Following a telemetry request, a telemetry send module loads the USART with data, which is then sent via the pipeline interface 37 to the master controller 24. The transmitted data uses a clock derived from the telemetry request signal.

If the Master Controller 24 does not receive data following a request it will try again automatically. It will continue this process for a limited number of tries before indicating communication link failure.

A diagnostics module checks the various areas of memory, and returns an error code for display, if a device is not working. In that event, the rest of the programme, except the monitor, does not run.

All RAM, and ROM, are tested with a "walking" bit pattern to test each bit of system memory.

A telemetry assembler module assembles data in the correct format in accordance with user defined tables. A buffer is used to store the data for use by the telemetry send module.

All peripherals and some RAM are initialised into a defined state before the DTU 36 is run. This task is performed by an initialisation module.

All global variables and constants are defined in the MAP file. Look-up tables and reserved memory areas are defined in the MAP file.

Current transducer values are monitored against user defined alarm ranges and transducer output trends to establish possible future alarm conditions. If an alarm condition is identified an alarm detection module interrupts the processor 55 and enables the telemetry/send module to transmit the alarm interrupt coding.

Timing of the alarm telemetry is scheduled for the interrupt time domain.

The Data Transfer system requires a source of power at the well 16 to operate its electronics. In the absence of an umbilical, the thermal electric generator 39 (TEG) is fitted directly to the pipeline (14) as a means of power generation local to the well 16.

The electrical power from the thermal electric generator 39 is provided by conversion of heat to electrical energy. Heat is provided by placing the generator 39 between a heat source and a heat sink. For this application the heat source is a flowing oil in the pipeline 14 and the sink, sea water.

Output from the PGU 39 is conditioned for use in the DTU 36 as shown in FIG. 11.

FIG. 14 shows one form of thermal electric generator 39 which is constructed as a pipeline stage. It has a bolted flange interface being provided with standard flanges 66. The PGU 39 is designed to generate approximately 250 watts across an oil/ambient temperature difference of 70° C.

Apart from the guard assembly, the PGU 39 is a one-piece steel unit.

Electrically, the unit 39 consists of four groups of five banks of Thermo-Electric Devices (TED) 67 with each bank having twelve devices in a longitudinal row.

Mechanically, this results in the requirement for twenty longitudinal rows of twelve devices 67 mounted on the surface of the unit 39. Therefore, twenty longitudinal facets with inter-facet wiring grooves are provided to mount the devices 67. The grooves are blind at one end and run into an annular wiring gallery at the other. The gallery also provides wiring access to the sub-sea mateable connector 68 which is mounted within a local flat area on a 45° conical face adjacent to the gallery.

Each TED 67 is bonded to its respective facet using a heat transmitting, strain tolerant adhesive. The two electrical leads (per TED) are arranged to lie in the wiring grooves such that when connected together, the wiring is submerged in the groove. The TEDs 67 are also arranged with a small longitudinal gap between each unit.

With the connector 68 installed and wired into the gallery, all grooves, gaps and galleries are "potted" using an epoxy resin up to the surface of the TEDs 67. A continuous plastic film 69 is applied all over the active area and is sealed to annular "lands" provided at each end.

Finally, the unit includes a protective guard which is formed by two robust annular discs 71 and 72, one at either end of the active area. The discs 71 and 72 are connected and retained by steel rods 73 which are held in place with stiffnuts 64, thus forming a cage 75. The cage 75 provides a guard for the active area.

FIG. 15 shows an alternative to the in-line PGU 39 described above with reference to FIG. 14. It is a segmented "bracelet" configuration power generation unit 76. This unit 76 will enable electrical power generation to be achieved without breaking into the flowline 14 as the unit 76 may be "wrapped" on to the flowline 14 retrospectively. The unit 76 is a clamp-on arrangement for installation between the tree 15A–E and the pipeline 14.

Two of these units would be required to produce 250 W although their combined length would be similar to a single "in-line" unit 39 as described above with reference to FIG. 14.

The basic principles of construction follow those used in the in-line PGU 39 except that they are applied to two separate clamp-on halves 77 and 78. The halves 77 and 78 include endplates 79 which include features which permit hingeing 81, clamping 82 and inter-half, flexible electrical connections.

The most significant detail design change as compared to the PGU 39 described above with reference to FIG. 14 applies to the "bore" of the unit which is clamped to the flowline 14 Each semi-bore 83,84 is grooved longitudinally and circumferentially so that approximately 2½ cm. square islands are produced. A flexible seal is attached to the perimeter of each semi-bore 83,84. A gallery connects the grooves to a connector mounted in one endplate.

The purpose of the above features is to enable the implementation of an assembly technique designed to eliminate the potential crevice corrosion between flowline 14 and the PGU bore. This is best illustrated by describing a typical installation sequence.

The unit 76 is initially loosely clamped to the flowline 14 such that the semi-bore seals are in light contact. At this point, a corrosion inhibitor cartridge is fitted to the connector and a quantity of the inhibiting liquid is injected into the space between the flowline 14 and the PGU 37, mixing with and displacing the sea water past the seals.

When a minimum level of inhibitor mixing has been exceeded in the captive chamber, the cartridge is removed and the clamps 82 are tightened until the PGU semi-bores 83 and 84 are in hard contact (in places depending on local tolerances) with the flowline 14. The inhibiting mixture is expelled past the seals (which are designed to permit outward flow with sufficient pressure differential) so that, on completion of clamp-up, non-contacting areas will be filled with the corrosion inhibiting mixture.

Finally, an inhibitor top-up and expansion compensation cartridge is fitted in place of the initial priming cartridge. This cartridge allows small flows of inhibiting fluid in and out of the clamped region to compensate for temperature change and also provides a slight overpressure so that in the event of seal leakage a measure of "top-up" would be afforded. However, even if the cartridge 85 were exhausted due to a small seal defect, allowing leakage, the rate of dilution of the inhibited mixture within the clamped region would be very slow due to a nominally zero pressure differential and a small connecting passage in the seal. It should also be noted that the material chosen for the PGU 39 would be the same as the flowline 14 to which it would be clamped, thus eliminating galvanic corrosion.

Figure 4:
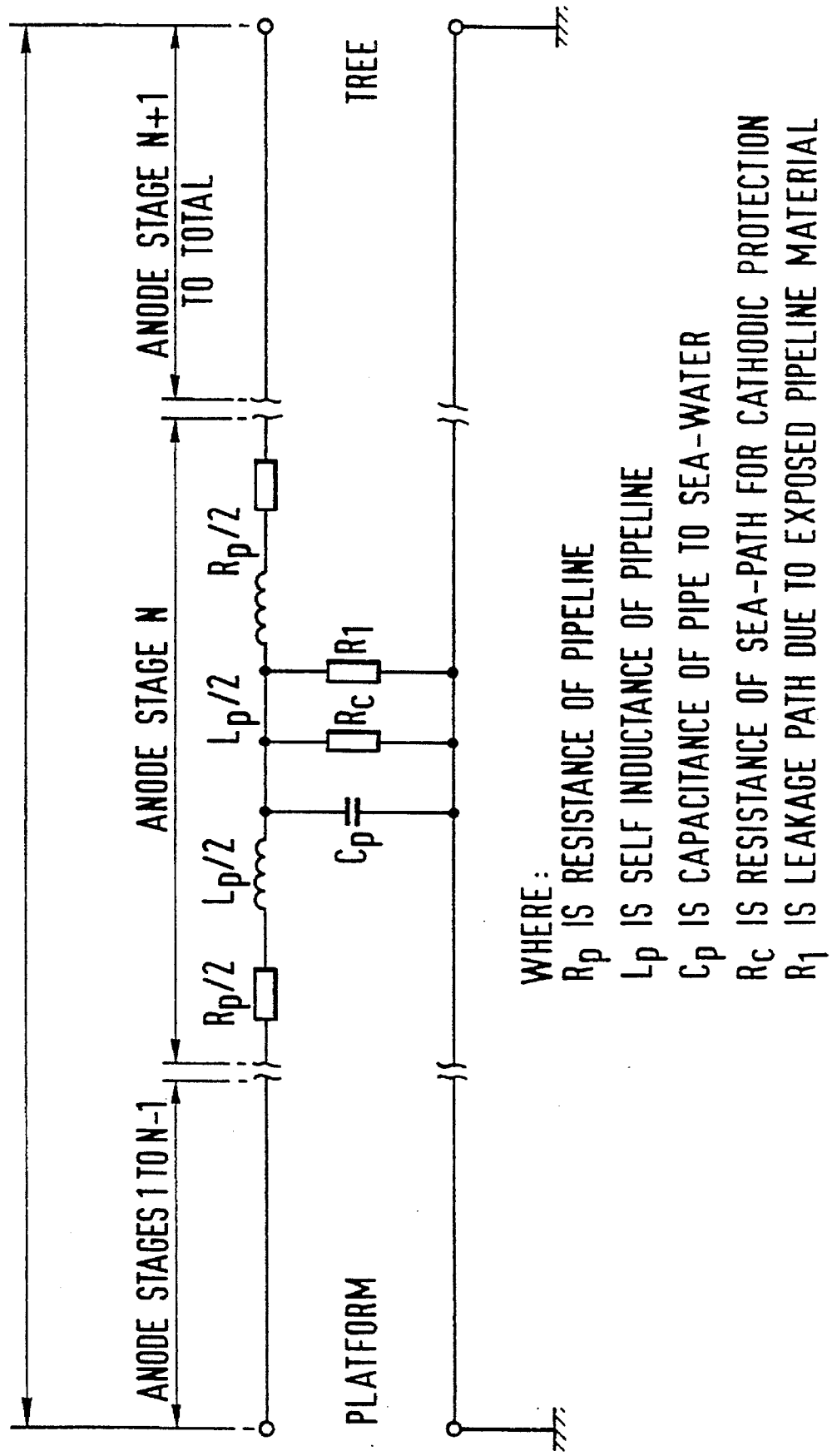
FIG. 4 is a circuit diagram of a pipeline equivalent circuit between a master station on a production platform and a sub-sea installation at a well head of the system shown in FIG. 1.

In operation of the preferred embodiment of the invention, a VLF signal (3–30 kHZ) or more especially an ELF (3–300 HZ) is induced on to an electrically isolated section of the pipe 12,14 (see FIGS. 3 and 4). The VLF or ELF signal applied to the pipe 12,14 is a pulsed electromagnetic signal which comprises changes of voltage level oscillating about the DC voltage level of the pipe 12,14 so that the mean level of the signal is equal to the DC voltage level of the pipe 12,14.

A loop then exists with current flowing through the pipeline structure and returning through the earth path/sea path returns. The loop is imperfect and current leak paths exist between the pipeline structure and the sea/earth returns in regions where metal surfaces are exposed, such as cathodic protection bracelets. The current flow is divided between the branch pipeline 14A–E at the manifold 13 and the signal is attenuated accordingly. Between each boundary between juxtaposed pipeline stages, as described above with reference to FIG. 3, the leakage and loss mechanisms modify the signal and establish the entry boundary conditions for the subsequent stage. The VLF or ELF signal is represented by a small potential imposed on one boundary at a very much lower current density than is typically provided by the influence of the respective anode.

Transmission is half-duplex between stations at the wellheads 16A–E and at the platform 10.

Input power limits and theoretical data rates depend on factors such as line inductance, line capacitance, line leakage (insulation integrity) and induced electro-magnetic noise values.

For low information rates of 50 bits per second or less, high integrity communication can be achieved over extended ranges without degradation of the cathodic protection.

FIGS. 1 to 3 show a pipe transmission line with earth and sea path returns plus signal input and signal capture systems at either end.

The DC resistance of the pipeline 12,14, even for 35 km, is very low (typically <1 ohm) given good electrical conductivity through pipe joints which can be reasonably expected if most joints are welded.

Many alternative signalling techniques could be applied since the choice to be made depends heavily on the conditions found in a practical situation.

Coding is applied to a carrier signal or basic link in order to minimise undetected bit error rate, and to facilitate extraction of a low energy signal from uncertain (and possibly variable) electro-magnetic noise.

Figure 5:
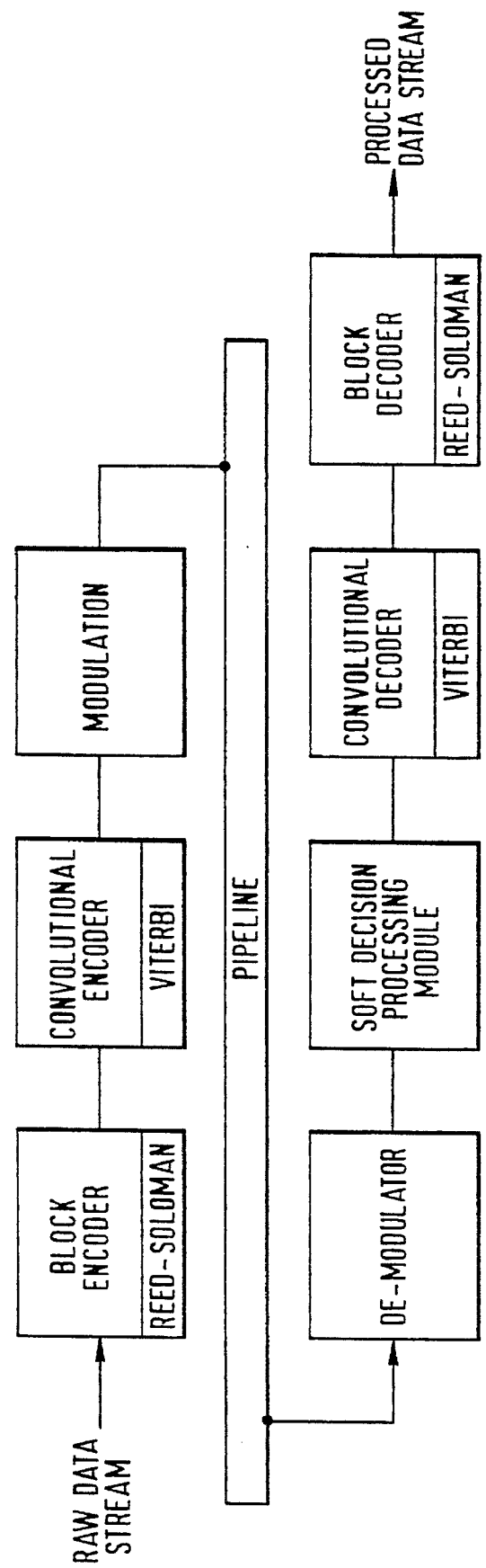
FIG. 5 is a block diagram illustrating the transmit and receive data coding employed in operation of the system shown in FIG. 1.

A block diagram showing the proposed coding/decoding strategy is given in FIG. 5.

It is envisaged that the system hardware will be largely common to all installations. However, specific parameters in the operating system will be configured for the particular installation. Two analyses are envisaged:

Pipeline electromagnetic noise spectral analysis; and
Pipeline configuration, length and interfaces.

The spectral analysis may be empirical for retro-fitment of the system on existing installations and would be theoretical on new builds. However, a knowledge of the electrical equipment on the platform 10 will enable a valid spectral model to be generated.

This analysis is used to identify the VLF or ELF frequency band in which the system will operate, and to enable frequency excision requirements to be defined. These are largely software modifications and could be installed either during manufacture or by intervention with the system once installed.

It is anticipated that the noise environment will change over the lifetime of the pipeline. This should not cause a problem if the system has an adequate link budget margin built in.

The pipeline configuration analysis will establish the signal power input required at the platform by considering loss mechanisms and noise sources. The maximum transfer range of the system is largely governed by the quality and integrity of the cathodic protection measures embodied in the pipeline construction and, in essence, the better the insulation of the pipeline 12,14, the further the system can transfer data.

A data transfer installation may consist of a single master station controlling up to 32 sub-sea data transfer units 36.

The architecture proposed for the system platform 10 and sub-sea processors 55 is structured to enable access to an array of operating data parameters which are unique to the oilfield installation. These include:

Frequency of known interference sources (Hz);
Identification address of the DTU (4 digit);
Identification number for each transducer being monitored (2 digit);
Changes from the default sampling rate;
Changes from the nominal data transfer interval; and
Changes to the default alarm ranges for each transducer.

The memory location is accessible to the platform operator, and individual data items stored may be updated at any time over the unit's operating life.

The transducer suite interface will accommodate up to:
16 bit analogue devices; and
16 single bit digital devices.

An interface unit will digitise the input range of each analogue device for temporary storage in the system memory. The memory will accommodate 400 data samples of each transducer in a circular buffer. All data points include the transducer identity and time of sampling. The DTU memory map is presented in FIG. 16.

The sub-sea elements of the Data Transfer System can operate in either self powered or externally powered configuration.

External power is considered to be a possibility when the system is installed in a back-up role, perhaps providing a safety facility to enable continued telemetry from sub-sea facilities in the event of umbilical degradation. With external power available, there are no constraints on the duty cycle of the system.

The system will operate in a self-powered configuration when located on a christmas tree which has no electrical supply. Power is produced from the thermo-electric generator 39 located on the oil flowline 14 as has been described above with reference to FIGS. 11, 14 and 15.

The DTU battery pack 61 is sized to provide 100 hours of operation prior to any energy top-up from the PGU 39. This period is intended to provide telemetry from the tree 15 during the start-up procedures.

Clearly, the PGU 39 reduces the internal energy of the oil by a small amount in this process, although the temperature reduction is a function of the flow rate and temperature gradient at that location. If this temperature reduction is seen as significant, an additional insulation coating could be applied to the local pipeline 14 so that the net heat loss at the tree site is unchanged.

The system is provided with a real time clock which is the only element of the system in continuous operation between the date of installation and the scheduled well start-up. This minimises the power demand of the system prior to the availability of the power generation unit 39, or external power supply.

The clock is part of a system initialisation circuit. The clock will be set during the system software configuration for the particular installation.

It is reasonable to predict the elapsed time between installation on the sea bed and the well start-up, and the clock will count down a dormancy period of up to 9000 hours using a Real Time Clock (RTC). At the zero hour, the system will be switched on. The clock will proceed to count for a period of up to 2 hours during which the system is listening for a transmission bearing its address code.

If no signal is received at the end of this period, the system will shut down and the clock will count up to a period of 168 hours (7 days user configurable). At this time the system will again turn on and listen for a signal. This "H" hours on, "D" days off cycle will be repeated until communication is established, or power is available from the power generation system.

If, at any time, the initialisation circuit detects power is available, the system will enter its normal data sampling mode at the default sampling rate. Once communication is established, the system is under control from the platform 10.

The first instruction sent from the platform 10 to a DTU 36 has three functions:

enable its transducer monitoring system and begin to assemble the data stream for transfer to the platform 10, or re-set the dormancy/wake-up cycle parameters, and synchronise the DTUs 36 with the master station 11.

Following a request for data, the Master Station waits for a reply message.

The first instruction from the platform 10 advises the signal processor 55 of any variations to the default sampling rate embodied in its software. The default sampling rate is once/60 minutes. The operator can modify the sampling rate as required at any time during the life of the DTU.

Normal data transfer is an automatic procedure. At regular intervals, the master station 11 launches the carrier on the pipeline 12,14 and imposes the digital address code and a data send command for one DTU 36.

After a defined period, the master station 11 curtails data transmission and listens for an upcoming signal. The sub-sea DTU 36 then follows an identical procedure and transfers the requested data.

On receipt, the master station 11 checks that the message is complete and valid. If it is not, then a repeat request is made otherwise the Master Station 11 moves on to request data from the next DTU 36.

All upcoming data streams are stored on floppy disc and may be assessed by graphical print-out, display or other analysis mediums which are commercially available. The control unit 24 will alert the operator when disc capacity exceeds 70%.

Normal sequential data transfer procedures may be interrupted by the operator at any time to allow special data transfer.

Special data transfers are initiated by the operator. The master station 11 is instructed to launch the carrier and impose on it:

The address of the DTU 36 of interest;

The address of the transducer(s) within that DTU 36;

Any step changes to the default sampling rate;

Any changes to the alarm range settings;

Data transfer command for defined data stored by circular buffer of the DTU 36.

Once sent, the master station waits for reply from the addressed DTU 36. This operation is terminated by master station operator command.

The master station 11 then returns to normal data transfer mode automatically.

Each sub-sea DTU 36 incorporates an alarm detection routine which monitors:

current transducer value against user defined (or default) alarm range; and recent transducer value trends for convergence with a user defined alarm range.

If either condition is detected, an alarm interrupt code is transmitted during the interrupt time domain of any current signal on the network or at any time if no transmissions are currently taking place.

This interruption causes the master station 11 to interrogate the alarmed DTU 36 and display an alarm warning on the platform 10; if more than one DTU 36 enters alarm condition then a schedule of interrogations is defined by the master station 11. In general, a reduced set of transducer samples will be transferred during alarm conditions to expedite the data availability at the platform 10.

The sub-sea elements of the data transfer system are configured for both new build pipelines or retrofit to an existing pipeline.

The DTU 36 should be sited to ensure that insulation of the pipeline 12,14 from the earth path return (i.e. the well casing) is not compromised. Cable runs will link each unit 36 to:

the transducer arrays;

either the external power supply or the power generation unit 39; and the upstream and downstream connections of the pipeline insulation Joint 21.

For retro-fit on an existing tree 15, the sub-sea components of the system may be configured as a pipeline spool-piece. This assembly would incorporate the PGU 39, DTU 36, wiring harness and insulating joint 21 within a structural framework to facilitate handling and installation. A possible configuration is shown in FIG. 17.

During installation at the tree site, the transducer wiring harness would be stowed in a vented containment.

It is envisaged that the spool-piece configuration would be specific to the installation site.

For new completions, the sub-sea system components may be mounted on the structure of the tree 15, enabling integrated testing of the tree 15 and the system on land.

During data transfer the earth path return of the well 16, and sea path return of the platform 10, are energised and an electro-magnetic field is created. Because of the large surface areas at connections 19 and 23 between well 16 and earth and platform to sea, the field strength at any location is small. Accordingly, the hazard to divers is considered to be no worse than for current sub-sea installations. Field strengths from the system will be comparable with those produced during sub-sea welding or at a sacrificial anode.

The crude product will be exposed to a low field strength alternating potential during transmissions. The effect, thus, will vary between crude products depending on their electrical resistance.

Fields around the sea path connection at the platform 10 are intermittent and of lower intensity than those of current sacrificial anodes. It is reasonable to infer that the system will have no more effect on marine life than current cathodic protection systems.

The PGU 39 will reduce the temperature of the crude product as it passes through it. If considered significant, this effect may be countered by provision of an insulation jacket to clad an equal surface area of the local flowline 14, such that the net heat loss is unchanged from current installations.

Structural steel guards are provided around all units of the system to ensure that transport and installation loads are accommodated without risk to the equipment.

Component redundancy is provided for the PGU 39 (4 banks of 60 devices) and the battery pack 61 (4 individual units 58). These will be installed to ensure graceful degradation in the event of component failures.

The invention may be operated to provide a condition monitor for the insulation of the pipeline. This may be done by determining the time history of errors in the carrier signal or basic link by comparing the basic link data with the processed data. Comparison of the basic link data with the processed data will produce an error count which depends on noise environment and signal attenuation due to leak paths. Alternatively it may be possible to detect corrosion effects by long term monitoring of input characteristic impedance of the pipe. The analysis can be extended to generate a Link Monitor Index. A health monitor module within the software of the system may be arranged to perform this task for all data transfers. Given that the noise level effects tend to average out over time, any trends (or step changes) in the value of the Link Monitor Index will be a reflection of the changes in the index and changes in the slope of the index time history. Either condition would trigger an alarm routine from the master station 11.

FIGS. 18 and 19 illustrate a system for transferring pressure and temperature data from a down hole location of a sub-sea well, in which the invention is embodied. FIG. 19 shows that insulation cored centring rings 76 are fitted to the production string 77 for providing insulation between the string 77 and the well casing 78.

In carrying out the invention a VLF or ELF EM signal is launched onto the production string 77 at the wellhead 16. The string 77 would need to have reasonable continuity, as well as be insulated as described, to minimise the power required at the wellhead 16 and to minimise current leak paths to the surrounding water, or kill fluids in the well. A further reason for providing insulation for the string 77 is the need for establishment of a reliable current return path.

The basal impedance of the string 77 and of its noise environment would need to be assessed before the instrumentation module, which may be electrically passive, is insulated in order to enable the signal strength and optimum frequency to be identified. The instrumentation module is packed in an annular structure and provides the following systems:

A down hole production string interface;
Pressure and temperature instrumentation including a Bourdon tube for pressure measurements and a bi-metallic strip for temperature measurements;
Tuned circuit installations; and
A casing interface.

The down hole production string interface consists of a tuned circuit which is energised by the carrier modulation induced on the production string 77. Movements of the Bourdon tube and the bi-metallic strip are arranged to vary two separate circuits to provide resonant frequencies which relate to temperature and pressure. A frequency sweep at the wellhead will establish the resonant spikes.

The data available at the wellhead 16 could be transferred to the platform 10 either by an umbilical cable or by a sub-sea data transfer system as has been described above with reference to FIGS. 1 to 17. Either form of Power Generation Unit 39 described above would be capable of powering the production string interface coils to provide down hole sampling.

We claim:

1. A pipeline system comprising a metal pipeline having a coating of insulating material which, in conjunction with sacrificial anodes electrically connected to the pipe provides cathodic protection, there being signal generating means adapted to be coupled to the pipeline and operable when so coupled to apply data to be transmitted in signal form to the pipeline for conveying along an electrically conducting channel formed by the metal pipeline, wherein the improvement comprises the signal generating means being operable to generate as the signal a pulsed electro-magnetic signal which comprises changes of voltage level in a very low frequency range (VLF and below), and further including means operable to use data transmitted via the channel provided by the pipeline for monitoring the condition of the insulation of the pipeline.

2. A pipeline system according to claim 1, adapted for the transfer of data between sub-sea facilities and a production platform of a sub-sea oil pipeline installation, the data to be transferred comprising instrumentation status information from any point on the pipeline installation, and the pipeline which forms the electrically conducting channel comprises a pipe for carrying the fuel/water between a well-head and the production platform, wherein a master station is provided for managing signalling in the system and for location on the platform, the master station being adapted so that the signal processing management takes place in one of three modes, viz. normal data transfer, special data transfer and alarm interrupt; means being provided whereby normal and special data transfers are initiated by the master station and alarm interrupts are initiated by any sub-sea unit which detects an alarm condition.

3. A pipeline system according to claim 2 wherein a thermo-electric generator is provided for sub-sea locations which do not have mains power available.

4. A pipeline system according to claim 3 wherein the thermo-electric generator has no moving parts and employs solid state arrays of thermo-electric devices which are sealed.

5. A pipeline system according to claim 3 wherein the power generation unit is in an in-line configuration.

6. A pipeline system according to claim 3 wherein the power generation unit is clamped around the pipeline.

7. A pipeline system according to claim 2 wherein all signal sequences incorporate an interrupt time domain to facilitate near real-time transfers of the alarm information.

8. A pipeline system according to claim 7 wherein a sub-sea data transfer unit which detects an alarm or a history of errors in the signal indicative of a future alarm condition in its transducer array, is adapted to transmit an alarm identity during the interrupt time domain of any ongoing transmission.

9. A pipeline system according to claim 2 wherein a flow turbine generator is provided for a sub-sea injection well which has no mains power available.

10. A pipeline system according to claim 2 wherein the data concerns conditions at a down hole location of a sub-sea well and in operation of the system is transferred from that location along the structure of the production string of that well.

11. A pipeline system according to claim 1, wherein the signal generating means are operable to generate the electromagnetic signal in the very low frequency range (VLF and below) so that it comprises changes of voltage level oscillating about the DC voltage level of the pipeline so that the mean level of the signal is substantially the DC voltage level of the pipeline.

12. A pipeline system comprising a metal pipeline having a coating of insulating material which, in conjunction with sacrificial anodes electrically connected to the pipe provides cathodic protection, there being signal generating means adapted to be coupled to the pipeline and operable when so coupled to apply data to be transmitted in signal form to the pipeline for conveying along an electrically conducting channel formed by the metal pipeline wherein the improvement comprises the signal generating means being operable to generate as the signal a pulsed electro-magnetic signal which comprises changes of voltage level in the very low frequency range, the signal generating means being operable to generate the electro-magnetic signal in the very low frequency range so that it comprises changes of voltage level oscillating about the DC voltage level of the pipeline so that the mean level of the signal is substantially the DC voltage level of the pipeline.

13. A pipeline system according to claim 12, adapted for the transfer of data between sub-sea facilities and a production platform of sub-sea oil pipeline installation, the data transferred comprising instrumentation status information from any point on the pipeline installation, and the pipeline which forms the electrically conducting channel comprises a pipe for carrying the fuel/water between a well-head and the production platform.

14. A pipeline according to claim 13 wherein the generated signal is in the extremely low frequency range below the audio range.

15. A pipeline system comprising a metal pipeline having a coating of insulating material which, in conjunction with sacrificial anodes electrically connected to the pipeline provides cathodic protection, and signal generating means adapted to be coupled to the pipeline and operable when so coupled to apply data to be transmitted in signal form to the pipeline for conveying along an electrically conducting channel formed by the metal pipeline, wherein the improvement comprises the signal generating means being operable to generate as the signal a pulsed electro-magnetic signal which comprises changes of voltage level in a very low frequency range (VLF and below), and wherein means are provided which are operable to use data transmitted via the channel provided by the pipeline to monitor a characteristic impedance of the pipeline and thereby monitor the condition of the insulation of the pipeline.

16. A pipeline system comprising a metal pipeline having a coating of insulating material which, in conjunction with sacrificial anodes electrically connected to the pipeline provides cathodic protection, and signal generating means adapted to be coupled to the pipeline and operable when so coupled to apply data to be transmitted in signal form to the pipeline for conveying along an electrically conducting channel formed by the metal pipeline, wherein the improvement comprises the signal generating means being operable to generate as the signal a pulsed electro-magnetic signal which comprises changes of voltage level in a very low frequency range (VLF and below), and wherein means are provided which are operable to use data transmitted via the channel provided by the pipeline to determine a time history of errors in a carrier signal and thereby monitor the condition of the insulation of the pipeline.

* * * * *